(12) United States Patent
Burns et al.

(10) Patent No.: US 6,186,061 B1
(45) Date of Patent: Feb. 13, 2001

(54) PRESS BEARING LUBRICATION SYSTEM

(75) Inventors: Bradley A. Burns, Wapakoneta; Edward A. Daniel, Ft. Loramie; Brian A. Watercutter, Minster, all of OH (US)

(73) Assignee: The Minster Machine Company, Minster, OH (US)

(*) Notice: Under 35 U.S.C. 154(b), the term of this patent shall be extended for 0 days.

(21) Appl. No.: 09/309,436

(22) Filed: May 11, 1999

(51) Int. Cl.$^7$ ...................................................... B30B 1/06
(52) U.S. Cl. .............................. 100/282; 72/450; 72/455; 83/615; 83/632; 100/214; 100/299; 184/6.14; 384/99; 384/114
(58) Field of Search .................................... 100/214, 280, 100/282, 299; 72/450, 455; 83/615, 632; 184/6.14; 384/99, 100, 114, 115, 118

(56) References Cited

U.S. PATENT DOCUMENTS

| | | |
|---|---|---|
| 2,375,269 | 5/1945 | Yeomans . |
| 2,696,410 | 12/1954 | Topanelian, Jr. . |
| 3,466,952 | 9/1969 | Greenberg et al. . |
| 3,508,430 * | 4/1970 | Edmondson .......................... 100/214 |
| 3,570,191 | 3/1971 | Williams . |
| 3,858,432 * | 1/1975 | Voorhees et al. ....................... 72/455 |
| 3,991,681 * | 11/1976 | Antosiak . |
| 4,048,841 * | 9/1977 | Kent ....................................... 72/455 |
| 4,156,387 * | 5/1979 | Portmann ................................ 83/615 |
| 4,206,953 | 6/1980 | Diehl et al. . |
| 4,295,690 | 10/1981 | Rutz . |
| 4,350,091 * | 9/1982 | Myles . |
| 4,375,785 * | 3/1983 | Schoch et al. ......................... 100/214 |
| 4,799,846 * | 1/1989 | Wissman et al. . |
| 4,883,367 | 11/1989 | Maruyama . |
| 5,060,760 | 10/1991 | Long et al. . |
| 5,556,207 | 9/1996 | Daniel . |
| 5,687,605 * | 11/1997 | Main . |
| 5,852,970 * | 12/1998 | Bornhorst et al. .................... 100/282 |
| 5,865,070 * | 2/1999 | Bornhorst et al. . |
| 6,070,523 * | 6/2000 | Burns et al. .......................... 100/282 |

* cited by examiner

Primary Examiner—Stephen F. Gerrity
(74) Attorney, Agent, or Firm—Randall J. Knuth

(57) ABSTRACT

A plurality of hydrostatic bearing pads are each integrally formed in a respective pin or journal member being used within a mechanical press machine. The hydrostatic bearing pads are supplied with pressurized fluid sufficient to create a combined hydrostatic and hydrodynamic effect between the opposed bearing surfaces of the pin and an associated bushing. The hydrostatic bearing pads are used in conjunction with rotational and oscillating bearings in which relatively little rotation, oscillation, or slow rotational speeds exist or where it is desired to minimize the effects of hydrodynamic action which creates bearing "lift off" on journal bearings. These types of bearings are particularly associated with crankshaft and connection journal bearings, connection pins, and pivot pins used by a rocker-type coupling assembly that couples a weight assembly to the press machine piston or slide assembly or drive assembly.

40 Claims, 13 Drawing Sheets

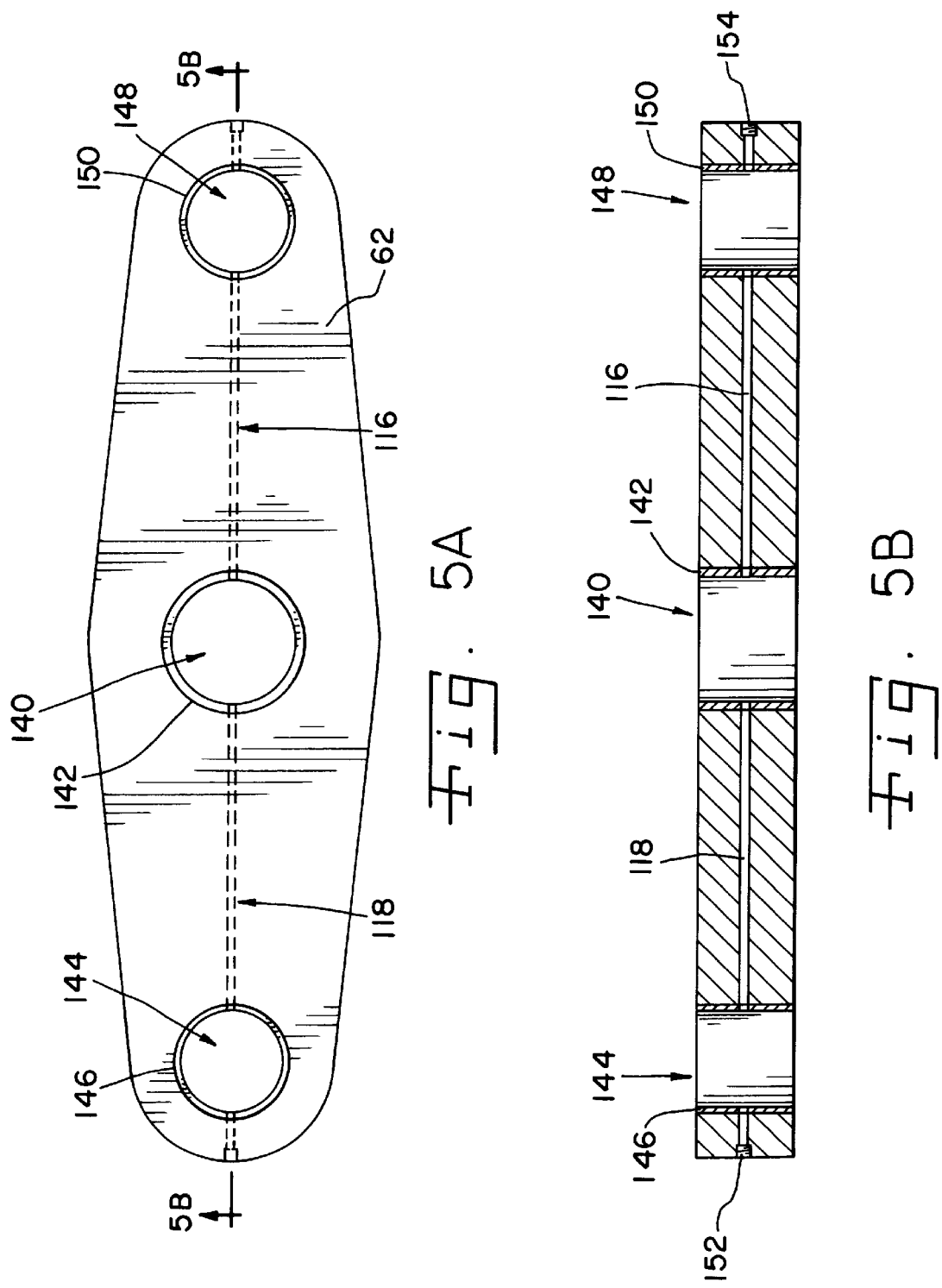

PRESS BEARING LUBRICATION SYSTEM

BACKGROUND OF THE INVENTION

1. Field of the Invention

The present invention relates generally to mechanical press machines and, more particularly, to a press bearing lubrication system that provides both hydrostatic and hydrodynamic bearing support at press wrist pins and other journal bearings characterized, for example, by oscillatory motion, relatively little rotation, and/or slow rotational speeds.

2. Description of the Related Art

Mechanical presses of the type performing industrial activity such as stamping and drawing operations have a conventional configuration including a frame with a crown and bed portion and a slide supported within the frame for reciprocating movement toward and away from the bed. A crankshaft rotatably disposed within the crown is arranged in driving connection with the slide using a connecting arm assembly. A flywheel assembly rotatably driven by a drive mechanism is selectively connectable with the crankshaft for driving rotation thereof, utilizing a clutch/brake combination to make the driving connection. These mechanical presses are used in a wide variety of workpiece operations employing a large selection of die sets, with the press machine varying substantially in size and available tonnage depending upon the intended use.

The primary source for stored mechanical energy in mechanical presses is the flywheel, which is conventionally located between the main drive motor and the clutch. The flywheel and its associated bearing are mounted on either the driveshaft, crankshaft, or the press frame by use of a quill. The main drive motor replenishes the energy lost from the flywheel during press stamping operations when the clutch couples the flywheel to the press driven parts. During engagement of the clutch, the flywheel drops in speed as the press driven parts are brought up to press running speed. The flywheel rotates in unison with the engaged clutch while the flywheel bearings have no relative rotation, except for the case of a quill arrangement whereby relative rotation is always present.

One of the critical demands in mechanical presses concerns providing adequate lubrication to the system parts to safeguard their structural integrity, promote durability, and avoid premature device failure. Efforts aimed at addressing this problem have focused on developing bearing arrangements that adequately support the principal rotary components throughout their operating cycle, namely the flywheel and crankshaft. However, what has been overlooked by such efforts, and consequently absent from the accompanying press design work, is the need to provide similar bearing protection at other press machine sites which, while not representing principal sources or recipients of work-related rotational energy, nevertheless exhibit relative motion between press parts that necessarily invokes a lubricating requirement. Examples of such machine sites include wrist pins and other journal bearings where there exists relatively little rotation, oscillation, and/or slow rotational speeds.

One conventional approach aimed at providing bearing support to these secondary motion sites proposes to create a hydrodynamic effect between the bearing surfaces of the associated devices. Generating such hydrodynamic activity requires a sufficient amount of relative rotation between the devices to mobilize or activate the oil film injected into the clearance space. For components such as wrist pins, however, developing a lubricating system that relies exclusively upon adequate relative rotation to produce the needed bearing support is not a complete or satisfactory solution. Accordingly, despite the availability of hydrodynamic assistance, problems still attend such press machine sites because of their dependence upon an operating condition, namely sufficient relative rotation, that does not manifest to any suitable degree.

A bearing support system based solely on hydrodynamic activity is ineffective in lubricating devices experiencing a low order of rotational or sliding motion. These devices are therefore typically characterized by high wear rates and sometimes premature failure of the bearing due to the minimal or non-existent hydrodynamic effect which otherwise is intended to accommodate the sliding motion occurring between the bearing surfaces. In terms of power requirements, the absence of adequate lubrication means that a relatively high torque is needed to rotate the bearings due to large frictional forces caused by the bearing surfaces sliding across each other. A larger drive system is therefore required due to the reduced efficiencies in power conversion. The elevated torquing action is accompanied by related increases in the thermal energy of the lubricating area, raising the operating temperature of the bearing and causing the oil viscosity to decrease, thereby reducing the load-carrying capacity of the bearing.

Bearing support limited to hydrodynamic activity still presents certain difficulties even if the rotational speeds are sufficient to create the intended hydrodynamic effect. In particular, as the devices commence their operation from a static condition and appreciable hydrodynamic activity appears, a "lift-off" effect occurs in which the bearing surfaces yield to an displacing pressure generated by the oil film as it undergoes hydrodynamic activity. This lift-off of the bearing surfaces causes a change in position of the crankshaft, pins, and linkages, resulting in a change in the press ram position at the bottom of each stroke relative to when the press is in a static condition. This ram displacement must be taken into account when installing the ram tooling or otherwise poor part quality and damaged tooling may result.

SUMMARY OF THE INVENTION

According to the present invention a plurality of hydrostatic bearing pads are each integrally formed in a respective pin or journal member being used within a mechanical press machine. The hydrostatic bearing pads are supplied with pressurized fluid sufficient to create a combined hydrostatic and hydrodynamic effect between the opposed bearing surfaces of the pin and an associated bushing. The hydrostatic bearing pads are preferably used in conjunction with rotational and oscillating bearings in which relatively little rotation, oscillation, or slow rotational speeds exist. These types of bearings, for example, are associated with crankshaft and connection journal bearings, connection pins that couple the press slide or weight assembly to the crankshaft which provides reciprocating motion, connection pins and pivot pins used by a rocker-type coupling assembly that couples a weight assembly to the piston assembly that drivingly reciprocates the press slide.

The invention, in one form thereof, includes a press comprising, in combination, a frame structure with a crown and a bed; a slide associated with the frame structure for reciprocating movement in opposed relation to the bed; a drive means associated with the frame structure for reciprocating the slide, the drive means including a piston assembly coupled to the slide; a balance means associated with the frame structure for balancing the slide; and a coupling means for coupling the balance means to the piston assembly, the coupling means comprising: a rocker assembly including a plurality of pivot pins, a first link assembly for coupling the piston assembly to the rocker assembly including a first plurality of connection pins, and a second link assembly for coupling the balance means to the rocker assembly including a second plurality of connection pins. The press further comprises a plurality of hydrostatic bearing pads each integrally associated with a respective pin from among the first plurality of connection pins, the second plurality of connection pins, and the plurality of pivot pins and each arranged to facingly oppose the bearing surface of an associated bushing disposed about the respective pin; and a means for providing each one of the plurality of hydrostatic bearing pads with pressurized fluid at least sufficient to create a hydrostatic bearing between the pin associated therewith and its respective bushing. The pressurized fluid provided by the pressurized fluid providing means is sufficient further to create a hydrodynamic bearing between the respective pin and its associated bushing.

The rocker assembly, in one form thereof, further comprises a plurality of rocker arms each pivotingly mounted to a respective one of the plurality of pivot pins. The first link assembly, in one form thereof, further includes a plurality of linking members each associated with a respective one of the plurality of rocker arms and further associated with a respective pair of connection pins from among the first plurality of connection pins, wherein one of the connection pin pair provides a connection between the respective linking member at one end thereof and the associated rocker arm and the other of the connection pin pair provides a connection between the respective linking member at another end thereof and the piston assembly. The second link assembly, in one form thereof, further includes a plurality of linking members each associated with a respective one of the plurality of rocker arms and further associated with a respective pair of connection pins from among the second plurality of connection pins, wherein one of the connection pin pair provides a connection between the respective linking member at one end thereof and the associated rocker arm and the other of the connection pin pair provides a connection between the respective linking member at another end thereof and the balance means.

For each cooperative arrangement including a rocker arm, a linking member associated therewith from the first link assembly, and a linking member associated therewith from the second link assembly, the pressurized fluid providing means, in one form thereof, further comprises: a rocker arm fluid means formed in the rocker arm and arranged to provide fluid communication between the associated pivot pin and each one of the connection pins associated therewith from the first plurality of connection pins and the second plurality of connection pins; a first fluid means formed in the linking member of the first link assembly and arranged to provide fluid communication between the pair of pins associated therewith from the first plurality of connection pins; and a second fluid means formed in the linking member of the second link assembly and arranged to provide fluid communication between the pair of pins associated therewith from the second plurality of connection pins. In respect of each hydrostatic bearing pad associated with the cooperative arrangement, there is further provided a means formed in the respective pin associated with the hydrostatic bearing pad and arranged to provide fluid communication between the hydrostatic bearing pad and the ones of the rocker arm fluid means, the first fluid means, and the second fluid means associated therewith.

The pressurized fluid providing means, in one form thereof, further comprises a pump arranged in fluid communication with at least one of the rocker arm fluid means, the first fluid means, and the second fluid means to supply pressurized fluid thereto. The pump, in one form thereof, is arranged in fluid communication with a fluid port formed in a stationary member of the press, the fluid port forming part of a fluid passageway defined in the stationary member and arranged for fluid communication with at least one of the rocker arm fluid means, the first fluid means, and the second fluid means.

The invention, in another form thereof, includes a press comprising, in combination, a frame structure with a crown and a bed; a slide associated with the frame structure for reciprocating movement in opposed relation to the bed; a drive means associated with the frame structure for reciprocating the slide, the drive means including a piston assembly coupled to the slide; a weight assembly; and a coupling means, including at least one connection assembly, for coupling the weight assembly to the piston assembly in a manner defining a balancing relationship between the weight assembly and the slide. Each one of the at least one connection assembly comprises, in combination, a rocker arm pivotingly mounted to an associated pivot pin, the pivot pin including a hydrostatic bearing formation arranged to facingly oppose the bearing surface of an associated bushing disposed about the pivot pin; a first linking member connected at one end thereof to the rocker arm using a respective one of an associated connection pin pair and connected at another end thereof to the piston assembly using a respective another of the associated connection pin pair, each one of the connection pin pair associated therewith including a respective hydrostatic bearing formation arranged to facingly oppose the bearing surface of an associated bushing disposed about the connection pin; and a second linking member connected at one end thereof to the rocker arm using a respective one of an associated connection pin pair and connected at another end thereof to the weight assembly using a respective another of the associated connection pin pair, each one of the connection pin pair associated therewith including a respective hydrostatic bearing formation arranged to facingly oppose the bearing surface of an associated bushing disposed about the connection pin. There is further included a means for providing each one of the hydrostatic bearing formations associated with the at least one connection assembly of the coupling means with pressurized fluid at least sufficient to create a hydrostatic bearing between the pin associated therewith and its respective bushing. The pressurized fluid provided by the pressurized fluid providing means is sufficient further to create a hydrodynamic bearing between the respective pin and its associated bushing. Each one of the hydrostatic bearing formations associated with the at least one connection assembly of the coupling means further comprises, in one form thereof, at least one hydrostatic bearing pad.

Each one of the at least one connection assembly of the coupling means further comprises, in combination, a rocker arm fluid means formed in the rocker arm and arranged to provide fluid communication between the pivot pin associated therewith and each one of the connection pins associated therewith; a first fluid means formed in the first linking member and arranged to provide fluid communication between the pair of connection pins associated therewith; and a second fluid means formed in the second linking member and arranged to provide fluid communication between the pair of connection pins associated therewith. In respect of each hydrostatic bearing formation associated with the one of the at least one connection assembly, there is further provided a means formed in the respective pin associated with the hydrostatic bearing formation and arranged to provide fluid communication between the hydrostatic bearing formation and the ones of the rocker arm fluid means, the first fluid means, and the second fluid means associated therewith. The pressurized fluid providing means further includes a pump arranged in fluid communication with at least one of the rocker arm fluid means, the first fluid means, and the second fluid means to supply pressurized fluid thereto. The pump, in one form thereof, is arranged in fluid communication with a fluid port formed in a stationary member of the press, the fluid port forming part of a fluid passageway defined in the stationary member and arranged for fluid communication with at least one of the rocker arm fluid means, the first fluid means, and the second fluid means. Each one of the rocker arm fluid means, the first fluid means, and the second fluid means preferably includes at least one fluid passageway.

The invention, in another form thereof, comprises a bearing system for use in a press machine, such press machine including: a slide; a drive means including a piston assembly for operatively reciprocating the slide; a weight assembly; a rocker assembly including a plurality of pivot pins; a first link assembly for coupling the piston assembly to the rocker assembly using a first plurality of connection pins; and a second link assembly for coupling the weight assembly to the rocker assembly using a second plurality of connection pins. The bearing system comprises, in combination, a plurality of hydrostatic bearing formations each integrally associated with a respective one of the plurality of pivot pins and each arranged to facingly oppose the bearing surface of an associated bushing disposed about the respective pivot pin; a plurality of hydrostatic bearing formations each integrally associated with a respective one of the first plurality of connection pins and each arranged to facingly oppose the bearing surface of an associated bushing disposed about the respective connection pin; a plurality of hydrostatic bearing formations each integrally associated with a respective one of the second plurality of connection pins and each arranged to facingly oppose the bearing surface of an associated bushing disposed about the respective connection pin; and a means for providing each one of the hydrostatic bearing formations with pressurized fluid at least sufficient to create a hydrostatic bearing between the pin associated therewith and its respective bushing. The pressurized fluid provided by the pressurized fluid providing means is sufficient further to create a hydrodynamic bearing between the respective pin and its associated bushing. Each one of the hydrostatic bearing formations, in one form thereof, further includes at least one hydrostatic bearing pad.

The rocker assembly, in one form thereof, further comprises a plurality of rocker arms each pivotingly mounted to a respective one of the plurality of pivot pins. The first link assembly, in one form thereof, further comprises a plurality of linking members each associated with a respective one of the plurality of rocker arms and further associated with a respective pair of connection pins from among the first plurality of connection pins, wherein one of the connection pin pair provides a connection between the respective linking member at one end thereof and the associated rocker arm and the other of the connection pin pair provides a connection between the respective linking member at another end thereof and the piston assembly. The second link assembly, in one form thereof, further comprises a plurality of linking members each associated with a respective one of the plurality of rocker arms and further associated with a respective pair of connection pins from among the second plurality of connection pins, wherein one of the connection pin pair provides a connection between the respective linking member at one end thereof and the associated rocker arm and the other of the connection pin pair provides a connection between the respective linking member at another end thereof and the weight assembly.

The invention, in another form thereof, comprises a bearing system for use in a press machine, such press machine including: a slide; a drive means including a piston assembly for operatively reciprocating the slide; a weight assembly; and at least one connection assembly for coupling the weight assembly to the piston assembly, each one of the at least one connection assembly comprising: a rocker arm pivotingly mounted to an associated pivot pin, a first linking member connected at respective ends thereof to the rocker arm and the piston assembly using a pair of connection pins associated therewith, and a second linking member connected at respective ends thereof to the rocker arm and the weight assembly using a pair of connection pins associated therewith. The bearing system comprises, in combination, a plurality of hydrostatic bearing formations each integrally associated with a respective pivot pin of an associated rocker arm of a corresponding one of the at least one connection assembly and arranged to facingly oppose the bearing surface of an associated bushing disposed about the respective pivot pin; a plurality of hydrostatic bearing formations each integrally associated with a respective one of the pair of connection pins of an associated first linking member of a corresponding one of the at least one connection assembly and arranged to facingly oppose the bearing surface of an associated bushing disposed about the respective connection pin; a plurality of hydrostatic bearing formations each integrally associated with a respective one of the pair of connection pins of an associated second linking member of a corresponding one of the at least one connection assembly aid arranged to facingly oppose the bearing surface of an associated bushing disposed about the respective connection pin; and a means for providing each one of the hydrostatic bearing formations with pressurized fluid at least sufficient to create a hydrostatic bearing between the pin associated therewith and its respective bushing. The pressurized fluid provided by the pressurized fluid providing means is sufficient further to create a hydrodynamic bearing between the respective pin and its associated bushing. Each one of the hydrostatic bearing formations associated with the at least one connection assembly further comprises at least one hydrostatic bearing pad.

The invention, in yet another form thereof, includes a press comprising, in combination, a frame structure with a crown and a bed; a slide associated with the frame structure for reciprocating movement in opposed relation to the bed; a drive means associated with the frame structure for reciprocating the slide, the drive means including a piston assembly coupled to the slide; a balance means associated with the frame structure for balancing the slide; and a coupling means for coupling the balance means to the piston assembly, the coupling means comprising: a rocker assembly, the rocker assembly including a plurality of pivot journal members, a first link assembly for coupling the piston assembly to the rocker assembly using a first plurality of connection journal members, and a second link assembly for coupling the balance means to the rocker assembly using a second plurality of connection journal members. The press further includes a plurality of hydrostatic bearing formations each integrally associated with a respective journal member from among the first plurality of connection journal members, the second plurality of connection journal members, and the plurality of pivot journal members and each arranged to facingly oppose the bearing surface of an associated bushing disposed about the respective journal member; and a means for providing each one of the plurality of hydrostatic bearing formations with pressurized fluid at least sufficient to create a hydrostatic bearing between the journal member associated therewith and its respective bushing. The pressurized fluid provided by the pressurized fluid providing means is sufficient further to create a hydrodynamic bearing between the respective journal member and its associated bushing. Each one of the hydrostatic bearing formations further comprises at least one hydrostatic bearing pad.

In one form thereof, the plurality of pivot journal members are arranged as integral parts of a respective common shaft; the first plurality of connection journal members are arranged as integral parts of a respective common shaft; and the second plurality of connection journal members are arranged as integral parts of a respective common shaft.

The invention, in yet another form thereof, comprises a bearing system for use in a press machine, such press machine including: a slide; a drive means including a piston assembly for operatively reciprocating the slide; a weight assembly; a rocker assembly including a plurality of pivot journal members; a first link assembly for coupling the piston assembly to the rocker assembly using a first plurality of connection journal members; and a second link assembly for coupling the weight assembly to the rocker assembly using a second plurality of connection journal members. The bearing system comprises, in combination, a plurality of hydrostatic bearing formations each integrally associated with a respective one of the plurality of pivot journal members and each arranged to facingly oppose the bearing surface of an associated bushing disposed about the respective pivot journal member; a plurality of hydrostatic bearing formations each integrally associated with a respective one of the first plurality of connection journal members and each arranged to facingly oppose the bearing surface of an associated bushing disposed about the respective connection journal member; a plurality of hydrostatic bearing formations each integrally associated with a respective one of the second plurality of connection journal members and each arranged to facingly oppose the bearing surface of an associated bushing disposed about the respective connection journal member; and a means for providing each one of the hydrostatic bearing formations with pressurized fluid at least sufficient to create a hydrostatic bearing between the journal member associated therewith and its respective bushing. The pressurized fluid provided by the pressurized fluid providing means is sufficient further to create a hydrodynamic bearing between the respective journal member and its associated bushing. Each one of the hydrostatic bearing formations further comprises at least one hydrostatic bearing pad.

In one form thereof, the plurality of pivot journal members are arranged as integral parts of a respective common shaft; the first plurality of connection journal members are arranged as integral parts of a respective common shaft; and the second plurality of connection journal members are arranged as integral parts of a respective common shaft.

One advantage of the present invention is that a combined hydrostatic and hydrodynamic bearing is now provided at connection joints in the press machine that heretofore only benefited from hydrodynamic effects, namely wrist pins, crankshaft journal bearings, and other such journal members.

Another advantage of the present invention is that the entire matrix of movable machine parts, ranging from the primary rotary devices such as the crankshaft and flywheel to the secondary components principally serving as linkage elements (e.g., wrist pins), is now fully lubricated in a manner that maintains adequate bearing support throughout the various press modes encompassing all types of static and dynamic conditions.

Another advantage of the present invention is that an oil film is continuously present between the bearing surfaces, providing protection against premature device failure and significantly reducing the wear rate of the bearings.

Another advantage of the present invention is that the hydrostatic bearing reduces the amount of torque required to rotate the bearing, providing greater efficiencies and therefore smaller drive systems, in addition to a more favorable thermal performance due to the lower operating temperatures of the bearing that accompany the reduction in friction.

Another advantage of the present invention is that since the bearing surfaces are separated by an oil film before rotation of the bearing occurs, as established and maintained by the hydrostatic bearing formation, the bearing will not experience any adverse repositioning due to "lift-off" after the press starts running. For example, in one form of the present invention, hydrostatic bearings provide the benefit of reduced or eliminated bearing "lift-off" between the hydrostatic bearings and the crankshaft journal bearings during start-up.

Another advantage of the present invention is that by positively locating the bearing surfaces during a static condition when oil is initially supplied and not after rotation begins, the post-rotation lift-off otherwise found in conventional bearing arrangements is minimized or eliminated, ensuring that the end of stroke position for the press ram is not affected.

Another advantage of the present invention is that by providing a pre-pressurized or pre-loaded bearing with the hydrostatic bearing formation, the ram tooling can be set without the need to account for the change in position caused by bearing surface lift-off, thus reducing the risk of damaged tooling and avoiding inferior part quality.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5A is an upper schematic view of the rocker arm used in the rocker assembly of the coupling arrangement shown in FIG. 3;

FIG. 5B is a lateral cross-sectional view of the rocker arm of FIG. 5A taken along lines A—A thereof;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
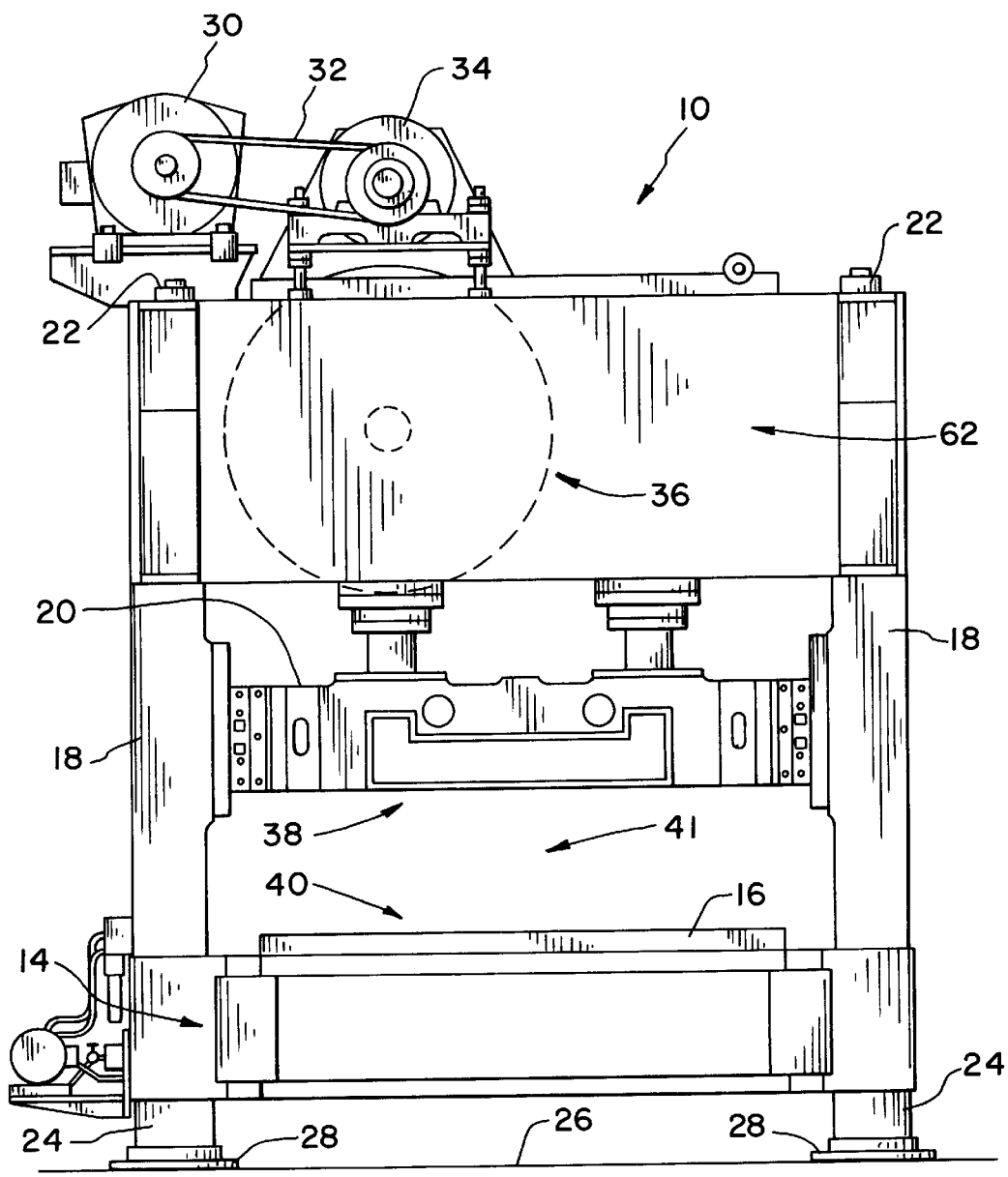
FIG. 1 is a front elevational view of a press machine in one illustrative form thereof incorporating the bearing support system of the present invention.

The bearing support system of the present invention may be installed within machines of the mechanical press type. Accordingly, reference is first made by way of background to FIG. 1, in which there is shown a mechanical press 10 of conventional form including a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for controlled reciprocating movement between crown 12 and bed 14. Tie rods (not shown), which extend through crown 12, uprights 18 and bed portion 14, are attached at each end with tie rod nuts 22. Leg members 24 are formed as an extension of bed 14 and are generally mounted on shop floor 26 by means of shock absorbing pads 28. A drive press motor 30, which is part of the drive mechanism, is attached by means of a belt 32 to an auxiliary flywheel 34 attached to crown 12. Auxiliary flywheel 34 is connected by means of a belt (not shown) to the main flywheel of the combination clutch/brake assembly, depicted generally at 36. This form of the press machine is described for illustrative purposes only as it should be apparent to those skilled in the art that the principles of the present invention may be practiced with, and incorporated into, other machine configurations. Press machine 10, when fully configured with a die assembly installed therein, further includes an upper die (not shown) generally located at area 38 and attached by known means in a conventional manner to the lower end of slide 20. A lower die (not shown) located generally at area 40 is attached by known means in a conventional manner to the upper end of bolster 16. The upper and lower dies, as so arranged in their opposing spaced-apart relationship, cooperate in a known manner during press operation to process a workpiece disposed therebetween, e.g., fastened to the lower die. The upper and lower dies together constitute a die set or assembly, and are located in and constitute an area known as the die space 41.

Figure 2:
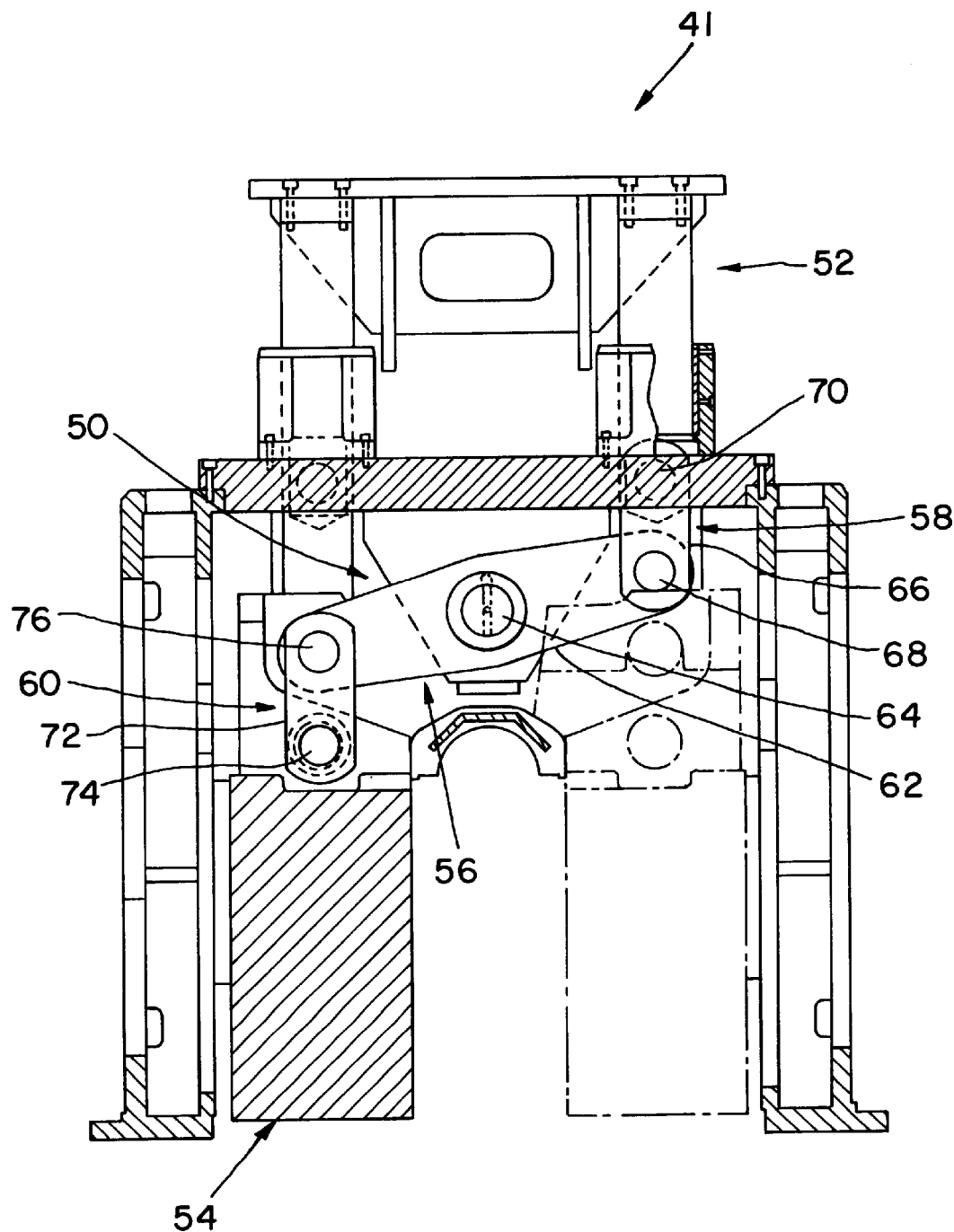
FIG. 2 is a lateral schematic view of an illustrative coupling assembly for use in the press machine of FIG. 1 that connects the slide to a weight assembly and which incorporates the bearing support system of the present invention, with the coupling assembly being shown in one orientation corresponding to slide stroke up and weight stroke down.

Referring now to the drawings, and particularly to FIG. 2, there is shown a lateral perspective view of press machine 10 to illustrate a coupling assembly 50 installed therein and in which is incorporated the bearing support system of the present invention. The illustrated coupling assembly 50 generally serves to couple a piston assembly referenced generally at 52 and located at the piston side of press machine 10 (e.g., proximate the die space 41 of machine 10) with a weight assembly referenced generally at 54 and located at the weight side of press machine 10 (e.g., proximate the top end of machine 10). This form of coupling is preferably ordered towards establishing a balancing relationship between weight assembly 54 and the reciprocating slide to which piston assembly 52 is drivingly coupled. Press machine 10 conventionally includes a crankshaft rotatably disposed within the crown and a driving means, comprised of a connecting arm assembly coupled at one end thereof to the crankshaft and connectedly arranged at another end thereof for driving connection with slide assembly 20, for transmitting the rotary motion of the crankshaft to the press slide as a reciprocating linear motion.

The illustrated coupling assembly 50 includes, in one form thereof, a rocker assembly 56, a first link assembly 58 disposed on the piston side and arranged to couple piston assembly 52 to rocker assembly 56 at one end thereof, and a second link assembly 60 disposed on the weight side and arranged to couple weight assembly 54 to rocker assembly 56 at another end thereof. Rocker assembly 56 operates conventionally in a pivoting or rocking manner to transmit the driving stimulus experienced at one end to the other end. For example, as the press slide is drivingly repositioned from its slide-stroke-up/weight-stroke-down condition represented in FIG. 2 to its slide-stroke-down/weight-stroke-up condition represented in FIG. 3, rocker assembly 56 and the interconnecting link assemblies 58 and 60 act cooperatively to displace weight assembly 54 in simultaneous accompaniment with the displacement of the press slide, which moves in unison with piston assembly 52. During the entire period of press cycling, it may be considered that rocker assembly 56 exhibits oscillatory motion as the press slide is driven in a linear reciprocating manner associated with workpiece tooling.

The illustrated rocker assembly 56 includes, in one form thereof, a rocker arm 62 of conventional construction pivotably mounted on a pivot pin 64. The illustrated first link assembly 58 includes, in one form thereof, a linking member 66 associated with rocker arm 62 and further associated with a respective pair of connection or wrist pins 68 and 70. Connection pin 68 provides a connection between linking member 66 at one end thereof and rocker arm 62, while connection pin 70 provides a connection between linking member 66 at another end thereof and piston assembly 52. Linking member 66 enables a reciprocating linear motion of piston assembly 52 (and hence the press slide) to be imparted to rocker arm 62 as an oscillatory pivoting motion or vice versa. The illustrated second link assembly 60 includes, in one form thereof, a linking member 72 associated with rocker arm 62 and further associated with a respective pair of connection or wrist pins 74 and 76. Connection pin 76 provides a connection between linking member 72 at one end thereof and rocker arm 62, while connection pin 74 provides a connection between linking member 72 at another end thereof and weight assembly 54. Linking member 72 enables the oscillatory pivoting motion of rocker arm 62, which acts under the influence of the reciprocating movement of piston assembly 52 and the press slide, to be imparted to weight assembly 54 as a corresponding reciprocating motion. The elements comprised of rocker arm 62, linking members 66 and 72, and the associated connection pin pairs 68–70 and 74–76 and pivot pin 64 constitute an integral connection assembly acting cooperatively to transfer reciprocating linear movement of the press slide to weight assembly 54 and vice versa. Coupling assembly 50 includes at least one such integral connection assembly to establish the coupling relationship between piston assembly 52 (and press slide) and weight assembly 54; however, it should be appreciated that any number of such connection assemblies working in tandem may be used. For purposes herein, the bearing support system of the present invention is described in relation to the illustrated coupling assembly 50, although it should be appreciated that the principles of the present invention are equally applicable to any other such connection assemblies of coupling assembly 50.

Figure 3:
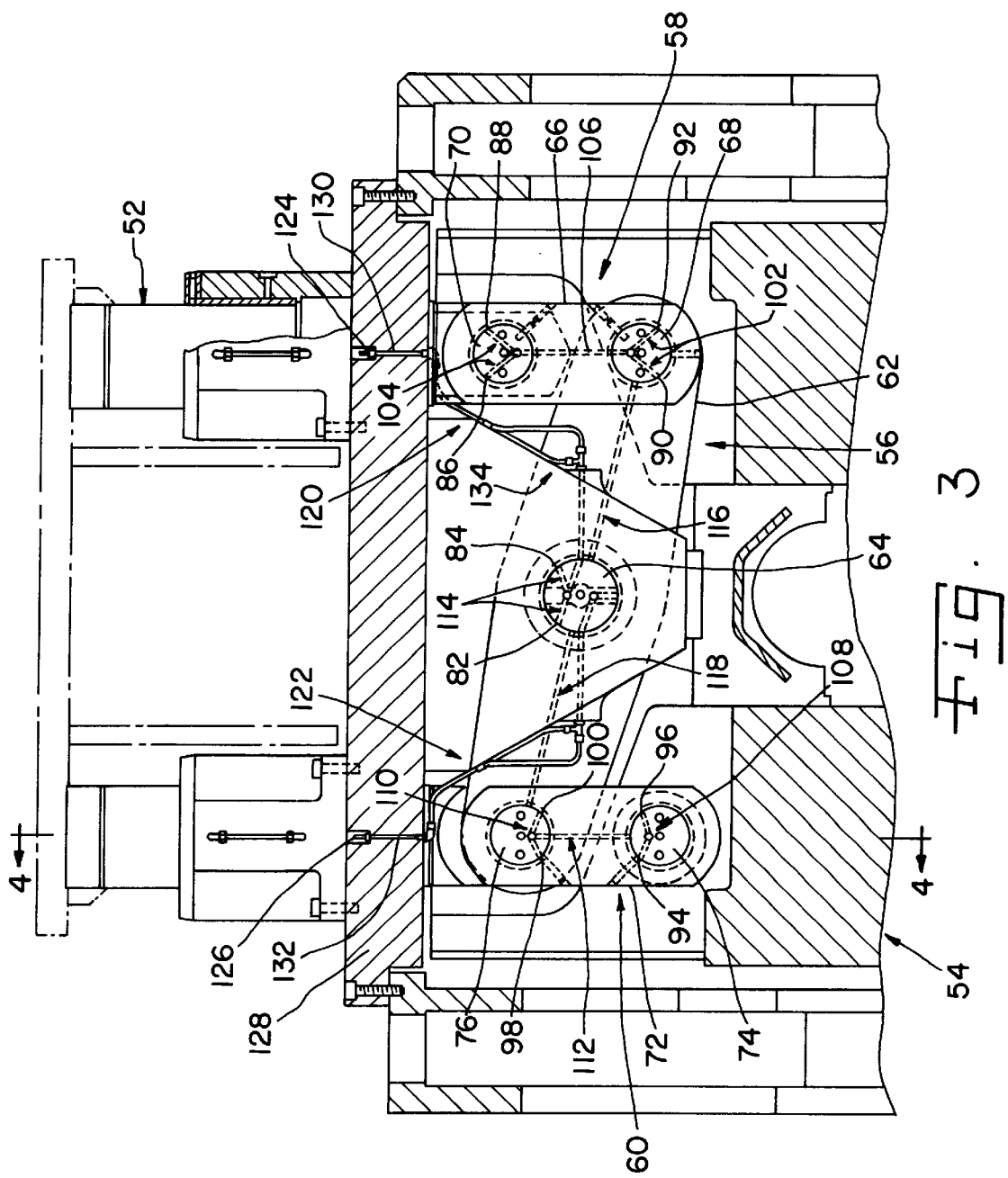
FIG. 3 is an enlarged lateral fragmentary sectional view of the coupling assembly of FIG. 2 illustrating the arrangement of hydrostatic bearing pads and fluid passageways comprising the bearing support system according to one embodiment of the present invention, illustrating another orientation of the coupling assembly corresponding to slide stroke down and weight stroke up.
Figure 4:
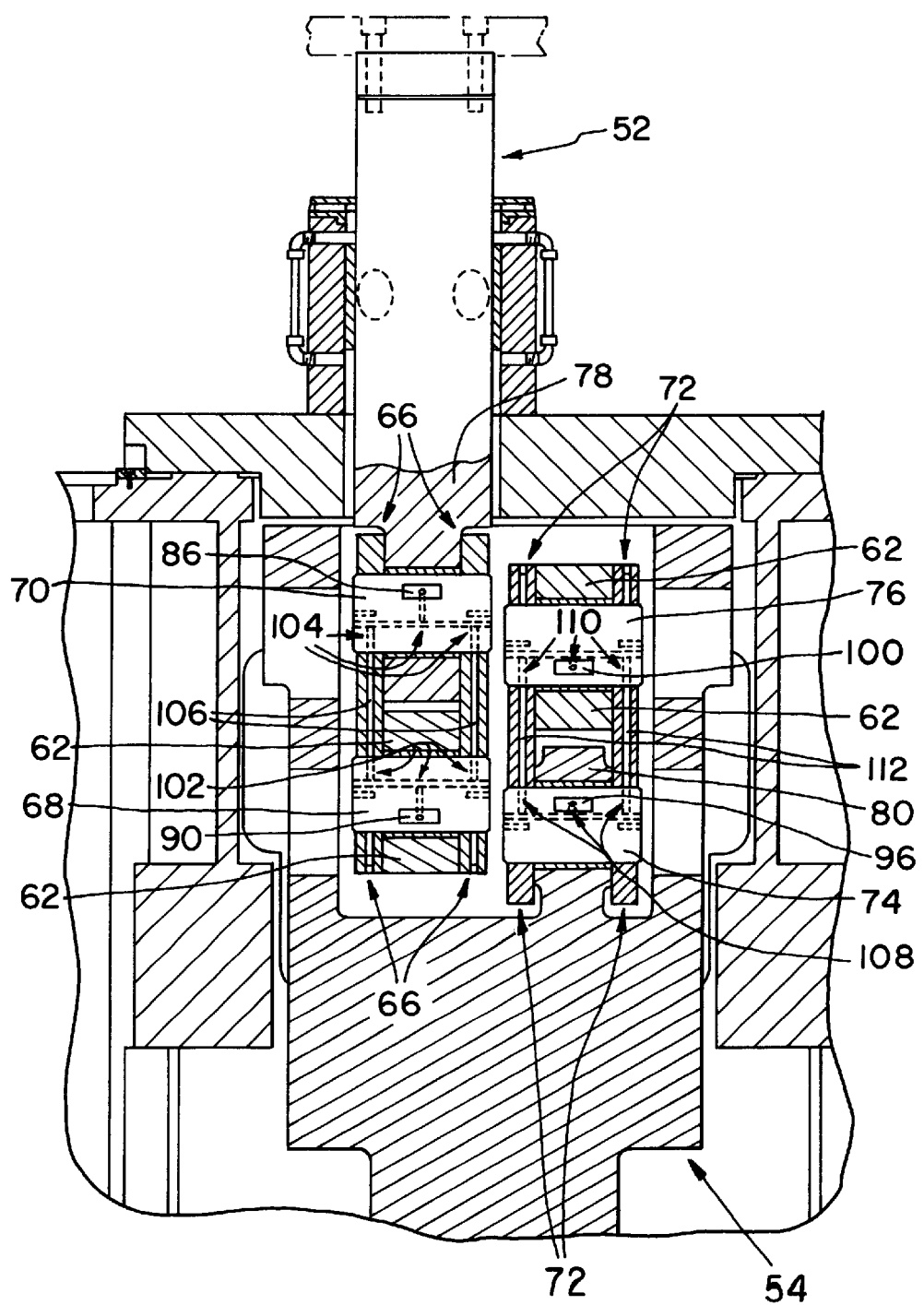
FIG. 4 is a front-side fragmentary cross-sectional view taken along lines A—A of FIG. 3 for illustrating the arrangement of hydrostatic bearing pads within their respective connection pins on both the piston side and weight side, according to one embodiment of the present invention.

Referring now to FIGS. 3 and 4, there is shown respectively an enlarged fragmentary section view of coupling assembly 50 representing in greater detail the features of a bearing support system according to one embodiment of the present invention and a cross-sectional view of press machine 10 taken along line A—A to illustrate the arrangement of hydrostatic bearing pads formed in the connection pins associated with each of linking members 66 and 72. For purposes of illustration, FIG. 4 makes reference to two adjacent connection assemblies of coupling assembly 50, and, in particular, reveals the cooperative arrangement of parts disposed at the top (i.e., weight) side of press machine 10 for coupling rocker arm 62 to weight assembly 54 (i.e., linking member 72 and connection pins 74, 76), and, in a view juxtaposed therewith, further reveals the cooperative arrangement of parts disposed at the die space (i.e., piston) area of press machine 10 for coupling rocker arm 62 to piston assembly 52 (i.e., linking member 66 and connection pins 68, 70).

Referring first in FIGS. 3 and 4 to the parts configured at the weight side of press machine 10, the illustrated linking member 72 is provided in the form of a first and second member portion spaced-apart from one another and coupled together at an upper end by connection pin 76 and at a lower end by connection pin 74. Rocker arm 62, at one end thereof, is annularly disposed about connection pin 76 in a manner that secures it between opposing sections of the first and second member portions of linking member 72. Connection pin 76 therefore pivotingly supports rocker arm 62 at its weight-side end. Weight assembly 54 at one illustrative portion 80 thereof is securely coupled to connection pin 74 by, for example, arranging weight portion 80 to be annularly disposed about connection pin 74. Connection pin 74 therefore provides support to weight assembly 54.

As shown in the accompanying view for the piston side of press machine 10, linking member 66 is likewise provided in the form of a first and second member portion spaced-apart from one another and coupled together at an upper end by connection pin 70 and at a lower end by connection pin 68. Rocker arm 62, at another end thereof, is annularly disposed about connection pin 68 in a manner that secures it between opposing sections of the first and second member portions of linking member 66. Connection pin 68 therefore pivotingly supports rocker arm 62 at its piston-side end. Piston assembly 52 at one illustrative portion 78 thereof is securely coupled to connection pin 70 by, for example, arranging piston portion 78 to be annularly disposed about connection pin 70. Connection pin 70 therefore provides support to piston assembly 52.

The individual parts and components for developing and arranging coupling assembly 50 are of conventional form and, accordingly, are described herein for illustrative purposes only as it should be appreciated that the present invention may be practiced with and incorporated into any such coupling configuration.

Each of the pin structures, in one preferred form thereof, is adapted for non-rotation by using an anti-rotational dowel that is keyed into a corresponding keyway formed in the respective pin. This immovability applies to pivot pin 64, piston-side connection pin pair 68–70, and weight-side connection pin pair 74–76.

The bearing support system in accordance with one embodiment of the present invention comprises a plurality of hydrostatic bearing formations each integrally associated with a respective one of the pins associated with coupling assembly 50, piston assembly 52, and/or weight assembly 54. The hydrostatic bearing formation, in one illustrative configuration thereof, is preferably provided in the form of at least one hydrostatic bearing pad defined in the outer bearing surface of the pin and arranged in the form of a recessed area with its open end facing the opposed bearing surface of an associated bushing that is annularly disposed about the respective pin. Each bearing formation is provided with pressurized fluid sufficient at least to create a hydrostatic bearing between the pin associated therewith and its respective bushing. The pressurized fluid, in a preferred form thereof, is further sufficient to create a hydrodynamic bearing between the pin and its bushing.

The ability to supply a sufficient quantity of liquid such as oil to enable full-film lubrication, accompanied by the arrangement of hydrostatic pads filled with sufficient pressurized liquid, has the effect of developing a combined hydrostatic/hydrodynamic bearing assembly having a load-supporting capability that accommodates all types of static or near-static conditions. The assembly becomes increasingly effective in its hydrodynamic mode with increases in the relative rotational speed between the pin and its associated bearing device. Since the connection points that are the focus of the bearing support system typically exhibit insufficient levels of relative rotation for purposes of generating reliable hydrodynamic activity, the real underlying advantage of the present invention is obtained through the hydrostatic activity, which is always present since the hydrostatic bearing pad is continuously supplied with pressurized fluid sufficient to provide a lubricating film of oil between the bearing surfaces at all times. Stated otherwise, even if the operating conditions are not compatible with the appearance of hydrodynamic activity, there will nevertheless be an independently created and sustainable hydrostatic effect to provide a commensurate measure of bearing support.

Although a pad structure is described herein, this particular construction should not be considered in limitation of the present invention as the bearing formation may be provided in any manner sufficient to enable the creation of a hydrostatic bearing between the respective pin and its associated bushing. For example, the bearing formation may be configured as a variable-depth trench, a series of circumferential grooves spaced-apart along the longitudinal dimension of the pin, and/or a series of spiral-patterned grooves. The illustrated bearing pad is structured as a shallow-depth recess having generally rectangular dimensions. Additionally, each pin is preferably accompanied by at least two such hydrostatic bearing pads arranged in any suitable manner about the pin bearing surface, but preferably configured to provide optimal or favorable bearing support properties aimed at affecting the load-carrying devices or structures associated therewith. The hydrostatic bearing formations are generally developed with a view towards providing the most beneficial load-bearing capabilities during static conditions or in quasi-static or low-order dynamic conditions characterized by relatively little rotation, slow rotational speeds, and/or oscillatory motion. These characteristics exemplify the range of activity typically found at the pins and other such journal members within which the hydrostatic bearing formations of the present invention are incorporated.

Referring again to FIGS. 3 and 4, the bearing support system of the present invention includes, in the view shown, the following hydrostatic bearing formations: pads 82 and 84 associated with pivot pin 64; pads 86 and 88 associated with connection pin 70; pads 90 and 92 associated with connection pin 68; pads 94 and 96 associated with connection pin 74; and pads 98 and 100 associated with connection pin 76. Each of the pins is accompanied by and has formed therein a fluid transport feature provided in the form of fluid passageways or channels arranged to enable fluid communication between the hydrostatic pad(s) and fluid channels located outside the pin. These external fluid paths, for example, may be formed in the structure supported by the pin (i.e., rocker arm 62 and linking members 66, 72) and are connectable with a pressurized fluid pump via intermediate piping apparatus. This arrangement of fluid channels in the pin provides a means by which pressurized fluid supplied by the pump can access the hydrostatic bearing pads. A further detailed look at the individual pads is included in the descriptions accompanying FIGS. 5–13.

The hydrostatic bearing pads, in one illustrative form thereof, are provided with the following network of fluid paths to facilitate the flow of pressurized fluid to the pads. Connection pins 68 and 70 associated with linking member 66 are respectively provided with fluid pathways formed therein having access to hydrostatic bearing pads 90–92, 86–88 and which are represented generally at 102 and 104, respectively. Fluid pathways 102 and 104 are arranged in fluid communication with one another using an interconnecting fluid pathway formed in linking member 66 and represented generally at 106. Similarly, connection pins 74 and 76 associated with linking member 72 are respectively provided with fluid pathways formed therein having access to hydrostatic bearing pads 94–96, 98–100 and which are represented generally at 108 and 110, respectively. Fluid pathways 108 and 110 are arranged in fluid communication with one another using an interconnecting fluid pathway formed in linking member 72 and represented generally at 112. Pivot pin 64 associated with rocker arm 62 is provided with fluid pathways formed therein having access to hydrostatic bearing pads 82–84 and which are represented generally at 114. Fluid communication is established between the hydrostatic bearing pads associated with pivot pin 64 and the hydrostatic bearing pads associated with connection pins 68, 70, 74, and 76 using fluid pathways formed in rocker arm 62 and represented generally at 116 and 118.

This entire network of fluid pathways is preferably arranged to facilitate a multiplexed supplying of pressurized fluid to all of the bearing pads using a single fluid source. For example, pressurized fluid is preferably supplied to the entire arrangement of hydrostatic bearing pads via fluid pathways 116 and 118 formed in rocker arm 62 using piping apparatus 120 and 122 that respectively connect fluid pathways 116 and 118 to fluid inlets 124 and 126 defined at corresponding orifices formed in stationary press member 128 (e.g., a bracket structure). Fluid inlets 124 and 126 are connected to a pressurized fluid pump (not shown) and are arranged for fluid communication with piping apparatus 120 and 122 using fluid pathways 130 and 132 formed in bracket 128. Fluid is thereby provided to the hydrostatic bearing pads using a single supply line connected to stationary member 128, which in turn feeds the five illustrated oscillation-type bearings associated with pivot pin 64 and connection pins 68, 70, 74, and 76. This form of connectivity eliminates all flexing oil supply lines while still providing hydrostatic lubrication to all of the bearings. The orifice used to control flow to the bearings is remotely mounted for improved serviceability. A single pressure monitoring switch 134 is remotely mounted at the illustrative location integral with piping apparatus 120 to monitor oil pressure downstream of the orifice. In the event that the orifice is plugged or a leak occurs in the oil supply line, the pressure switch would detect the loss in supply pressure and issue a command to the press controller to stop the press to prevent damage to the bearings.

Figure 7A:
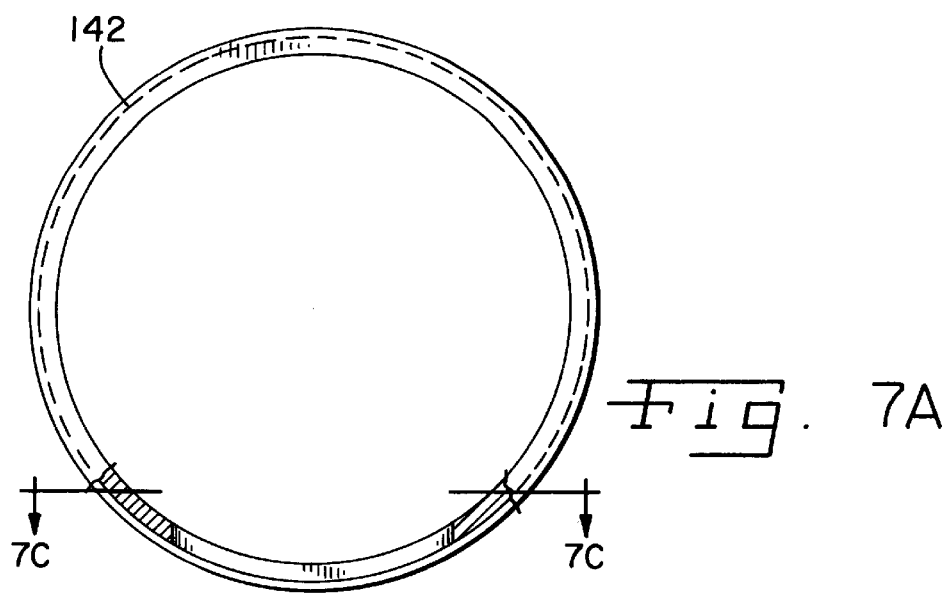
FIG. 7A is an axial view of the bushing used in conjunction with the pivot pin of FIGS. 6A–C.
Figure 7B:
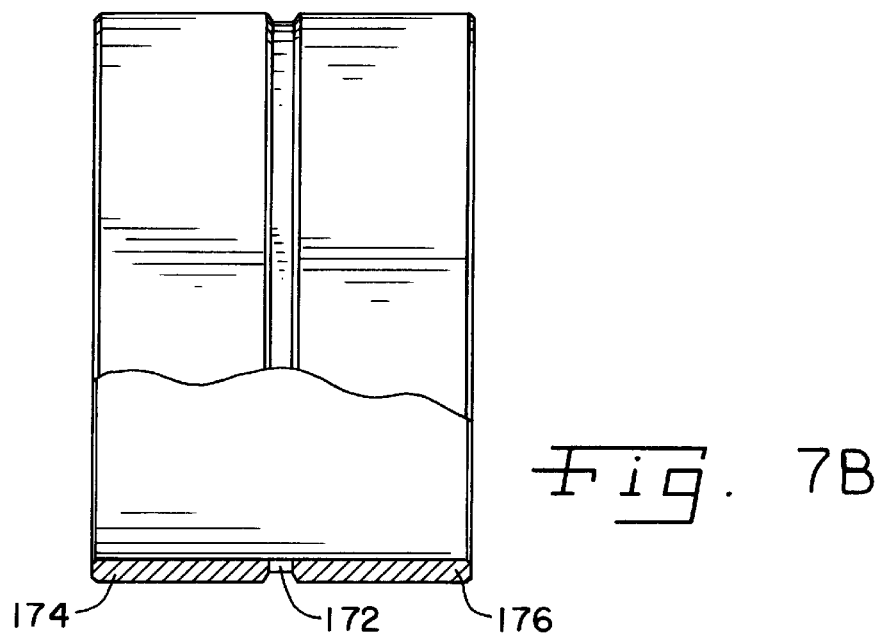
FIG. 7B shows a lateral exterior section view of the bushing of FIG. 7A taken along line A—A thereof in juxtaposition with a lateral interior cross-sectional view taken along line B—B thereof for illustrating a groove formed in the bushing that provides fluid access to the hydrostatic bearing pads.
Figure 7C:
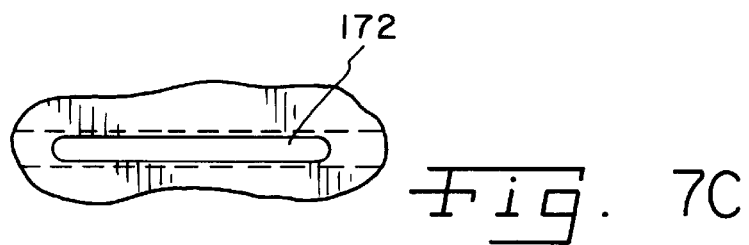
FIG. 7C is an interior fragmentary section view of the groove formed in the bushing of FIG. 7B.
Figure 8A:
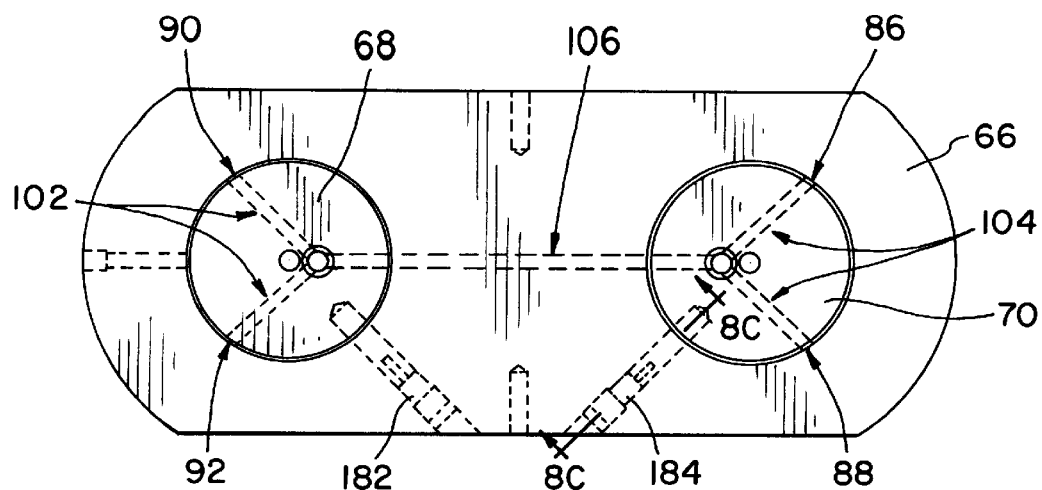
FIG. 8A is an upper schematic view of one illustrative linking member as configured with respective connection pins for use in coupling the piston assembly to the rocker arm assembly.
Figure 8B:
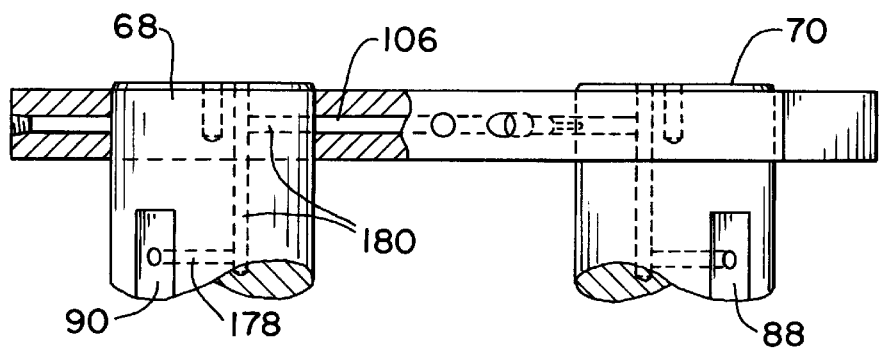
FIG. 8B is a lateral fragmentary section view of the linking member of FIG. 8A taken along line A—A thereof for illustrating the arrangement of hydrostatic bearing pads in each connection pin and depicting in phantom view the fluid passageways formed in the pins and their interconnectivity.
Figure 8C:
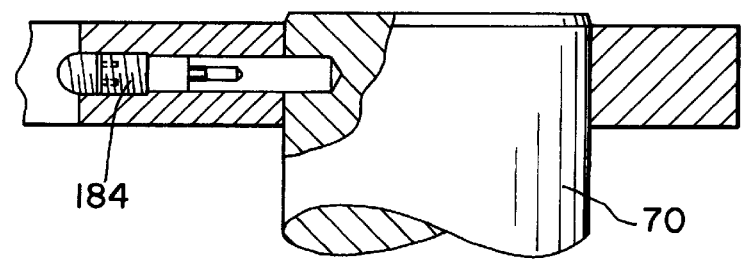
FIG. 8C is a lateral fragmentary cross-sectional of one of the connection pins of FIGS. 8A–B taken along line B—B thereof showing the keyed placement of an anti-rotation dowel.
Figure 10A:
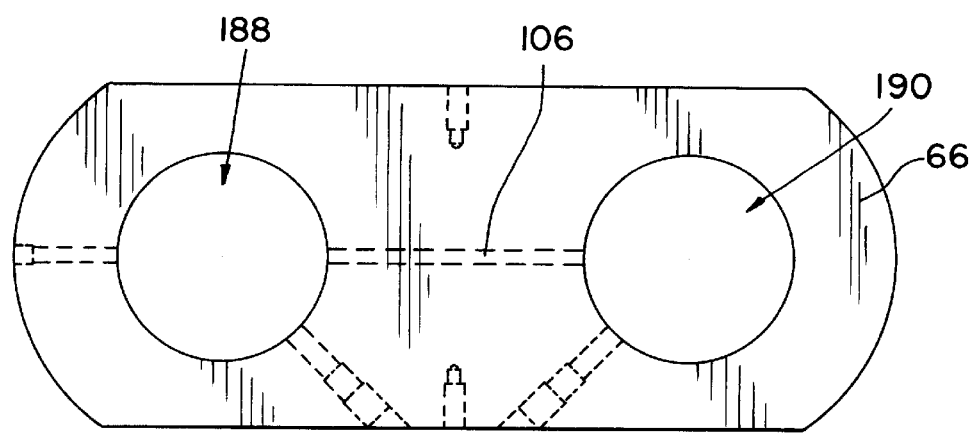
FIG. 10A is an upper schematic view of the linking member of FIG. 8A.
Figure 10B:
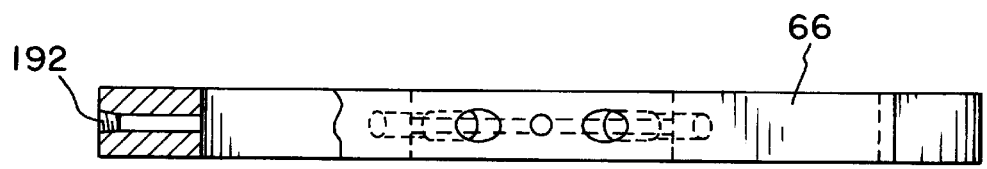
FIG. 10B is a multiple lateral view of the linking member of FIG. 10A taken along line A—A thereof for depicting the linking member in both a cross-sectional and exterior view.
Figure 11A:
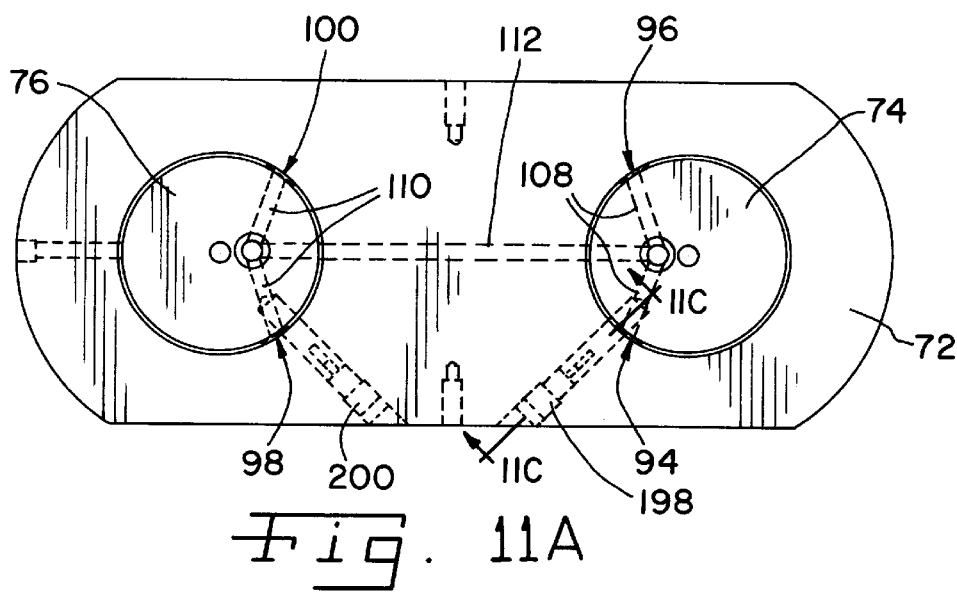
FIG. 11A is an upper schematic view of one illustrative linking member as configured with respective connection pins for use in coupling the weight assembly to the rocker arm assembly.
Figure 11B:
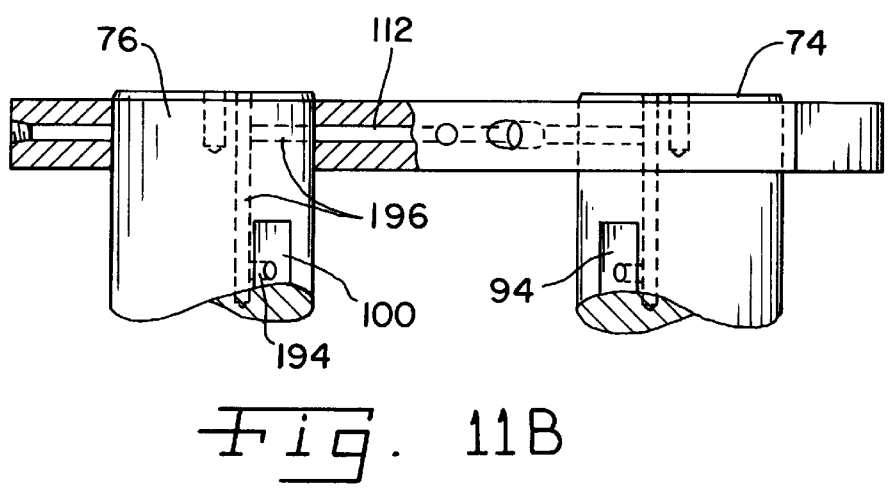
FIG. 11B is a lateral fragmentary section view of the linking member of FIG. 11A taken along line A—A thereof for illustrating the arrangement of hydrostatic bearing pads in each connection pin and depicting in phantom view the fluid passageways formed in the pins and their interconnectivity.
Figure 11C:
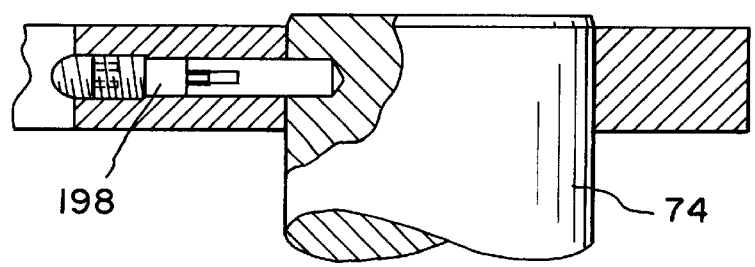
FIG. 11C is a lateral fragmentary cross-sectional of one of the connection pins of FIGS. 11A–B taken along line B—B thereof showing the keyed placement of an anti-rotation dowel.

Referring now to FIGS. 5–13, there is shown a series of schematic drawings illustrating the features of the bearing support system in relation to the structure and placement of the hydrostatic bearing pads and the network of fluid pathways connected thereto. In particular, FIGS. 5–7 show various views of rocker arm 62, pivot pin 64, and a bushing associated therewith; FIGS. 8–10 illustrate linking member 66 and associated connection pins 68 and 70; and FIGS. 11–13 depict linking member 72 and associated connection pins 74 and 76.

Referring first to FIGS. 5–8, the illustrated rocker arm 62 shown in FIG. 5A includes a central bore area 140 defined therein and having a bushing 142 disposed therein to insertably receive pivot pin 64. Rocker arm 62 further includes at one end thereof a bore area 144 defined therein and having a bushing 146 disposed therein to insertably receive connection pin 76 associated with linking member 72. Rocker arm 62, at another end thereof, includes a bore area 148 defined therein and having a bushing 150 disposed therein to insertably receive connection pin 70 associated with linking member 66. FIG. 5B, which shows a cross-sectional view of rocker arm 62 taken along line A—A, illustrates the manner in which fluid pathways 116 and 118 formed in rocker arm 62 provide fluid communication between pivot pin 64 and connection pins 76 and 70. Plugs 152 and 154 define terminal ends of fluid pathways 116 and 118, respectively.

Figure 6A:
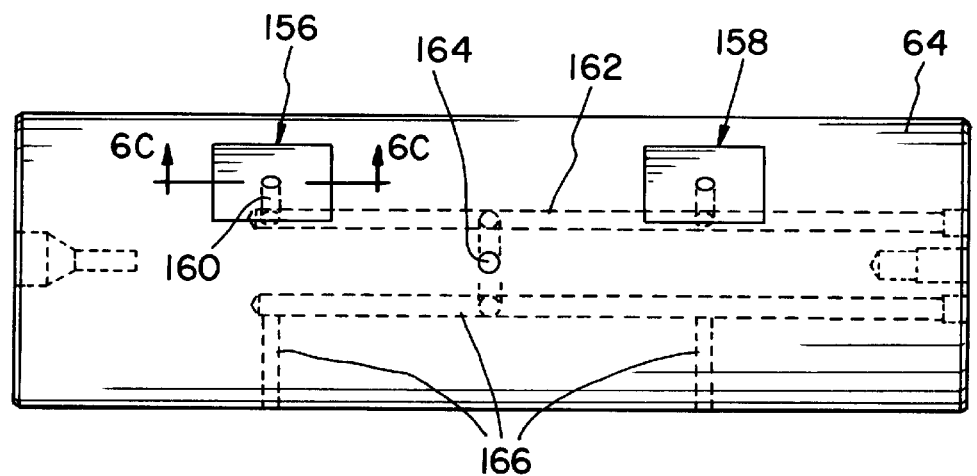
FIG. 6A is a lateral view of the pivot pin used in the rocker arm of FIG. 5A illustrating its respective arrangement of hydrostatic bearing pads and depicting in phantom view the fluid passageways connected thereto.
Figure 6B:
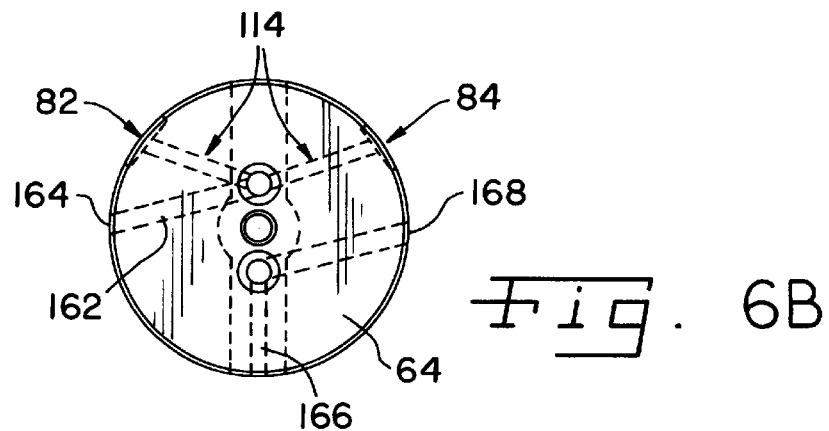
FIG. 6B is an axial view of one end of the pivot pin of FIG. 6A.
Figure 6C:
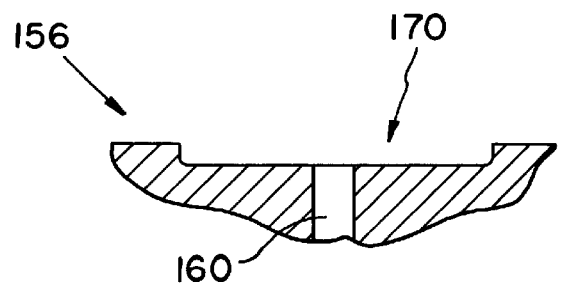
FIG. 6C is a cross-sectional view of one hydrostatic bearing pad of FIG. 6A taken along lines A—A thereof.

FIG. 6A shows in sectional view an illustrative arrangement of hydrostatic bearing pads 156 and 158 formed in pivot pin 64. Representative bearing pad 156 is arranged with a respective fluid channel 160 coupled to a common fluid channel 162 that connects to a fluid port 164 configured for fluid communication with a respective one of the fluid pathways outside pivot pin 64 (e.g., a supply line for one of the piping apparatus 120, 122 and/or fluid pathways 116, 118 formed in rocker arm 62). This arrangement of fluid channels implements, at least in part, the fluid pathway 114 in FIG. 3. Pivot pin 64 may also be provided with an arrangement of fluid channels 166 to supply pressurized fluid into the clearance space formed between the bearing surfaces of pivot pin 64 and bushing 142. Fluid channel arrangement 166, for example, may be coupled at fluid port 168 to one of the piping apparatus 120, 122 and/or fluid pathways 116, 118 formed in rocker arm 62. FIG. 6B shows an axial end view of pin 64 with the illustrative hydrostatic bearing pads 82 and 84 of FIG. 3, with pad 84 corresponding to pad 158 of FIG. 6A, for example. FIG. 6C is a representative cross-sectional view of hydrostatic bearing pad 156 taken along line A—A. Bearing pad 156 is generally defined, in one illustrative form thereof, by a recess area 170 formed in the outer bearing surface of pin 64 and which is coupled to fluid channel 160 to permit the flow of pressurized oil into pad 156 and thereby form a hydrostatic bearing between pivot pin 64 and its associated bushing 142.

FIG. 7A shows an axial end view of bushing 142 annularly disposed about pivot pin 64. As shown in the multi-section view of FIG. 7B taken along line A—A, pivot bushing 142 includes an annular groove 172 provided at its periphery to define a first bushing portion 174 and a second bushing portion 176 separated by the illustrated groove 172. FIG. 7C shows an enlarged fragmentary section view of groove 172 taken along line B—B. Groove 172 enables fluid communication between pivot pin 64 (i.e., the hydrostatic bearing pads and the arrangement of fluid channels formed therein) and the fluid lines outside pivot pin 64 (i.e., fluid piping apparatus 120, 122 and fluid channels 116, 118 formed in rocker arm 62).

Figure 9A:
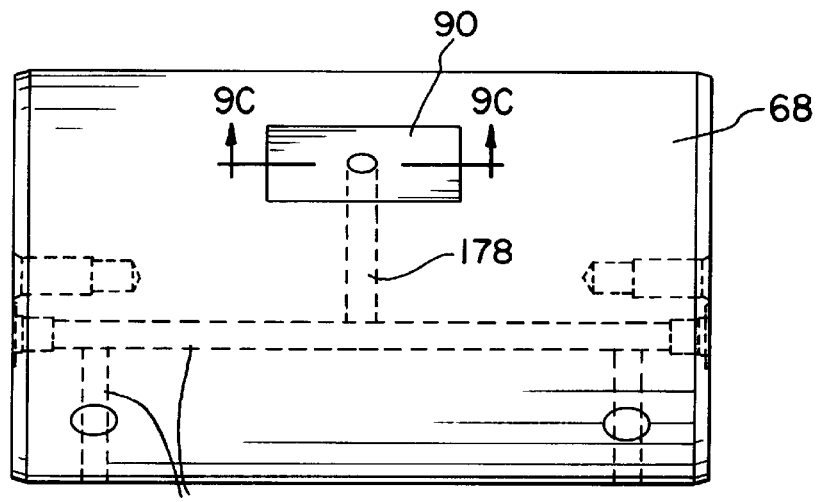
FIG. 9A is a lateral schematic view of the connection pin of FIGS. 8A–C illustrating the placement of the hydrostatic bearing pad and depicting in phantom view the matrix of fluid passageways connected thereto.
Figure 9B:
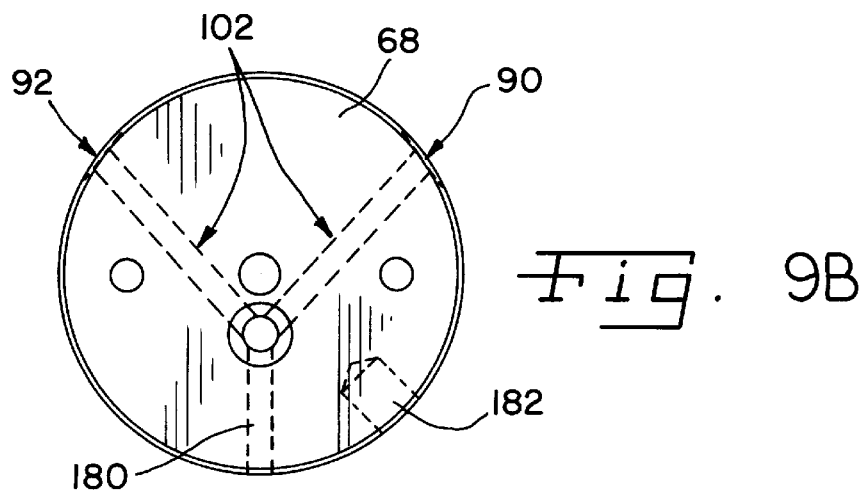
FIG. 9B is an axial end view of the pin of FIG. 9A illustrating the arrangement of fluid passageways in communication with the hydrostatic bearing pads and which provide access to fluid supply lines outside the pin.
Figure 9C:
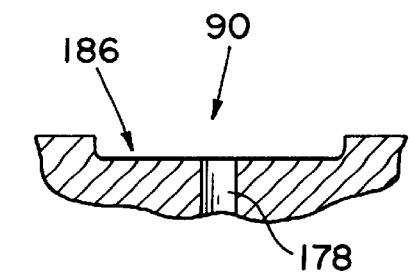
FIG. 9C is a lateral fragmentary cross-sectional view of the hydrostatic bearing pad of FIG. 9A taken along line A—A thereof.

Referring now to FIGS. 8–10, there is shown in FIG. 8A an upper schematic view of linking member 66 as assembled with connection pins 68 and 70. As shown in the cross-sectional view of FIG. 8B taken along line A—A of FIG. 8A, representative hydrostatic bearing pad 90 of connection pin 68 includes a fluid pathway arrangement 102 comprising a fluid channel 178 connected to pad 90 and a connecting fluid channel 180 that is configured for fluid communication with fluid pathway 106 formed in linking member 66 and arranged for fluid communication with connection pin 70. Each of the connection pins 68 and 70 is adapted for non-rotation using respective dowel pins 182 and 184. FIG. 9A shows a side view of connection pin 68 further illustrating hydrostatic bearing pad 90 and its connected arrangement of fluid channels 178 and 180, while FIG. 9B is an axial end view thereof. FIG. 9C is a cross-sectional view of hydrostatic bearing pad 90 taken along line A—A, in which is shown a recess area 186 formed in connection pin 68 that defines pad 90. FIG. 10A shows linking member 66 to illustrate its bore areas 188 and 190 defined therein for respectively receiving connection pins 68 and 70. FIG. 10B is a cross-sectional view of linking member 66 taken along line A—A of FIG. 10A to illustrate the insertion points for dowels 182, 184 and oil plug 192.

Figure 12A:
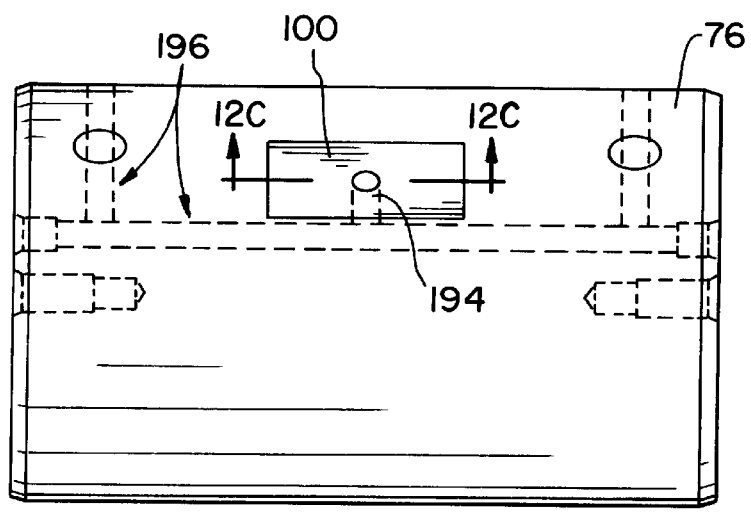
FIG. 12A is a lateral schematic view of the connection pin of FIGS. 11A–C illustrating the placement of the hydrostatic bearing pad and depicting in phantom view the matrix of fluid passageways connected thereto.
Figure 12B:
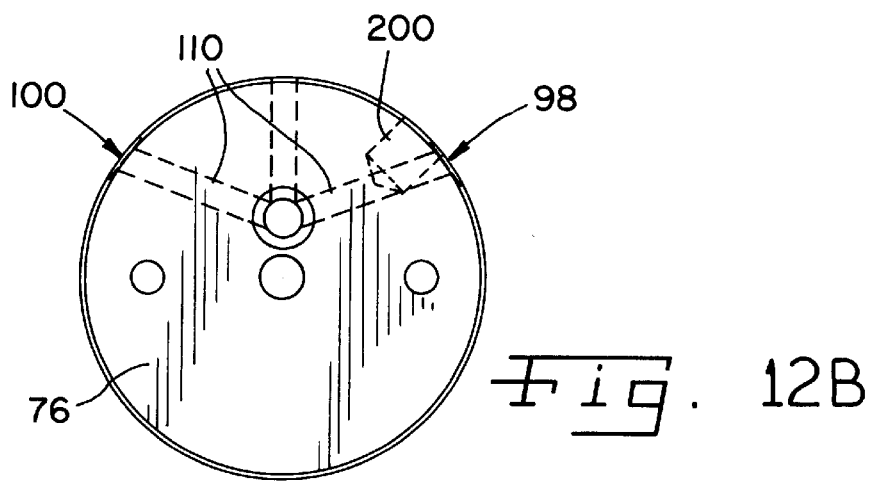
FIG. 12B is an axial end view of the pin of FIG. 12A illustrating the arrangement of fluid passageways in communication with the hydrostatic bearing pads and which provide access to fluid supply lines outside the pin.
Figure 12C:
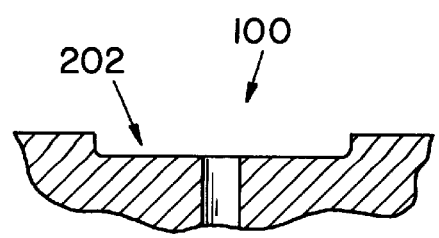
FIG. 12C is a lateral fragmentary cross-sectional view of the hydrostatic bearing pad of FIG. 12A taken along line A—A thereof.
Figure 13A:
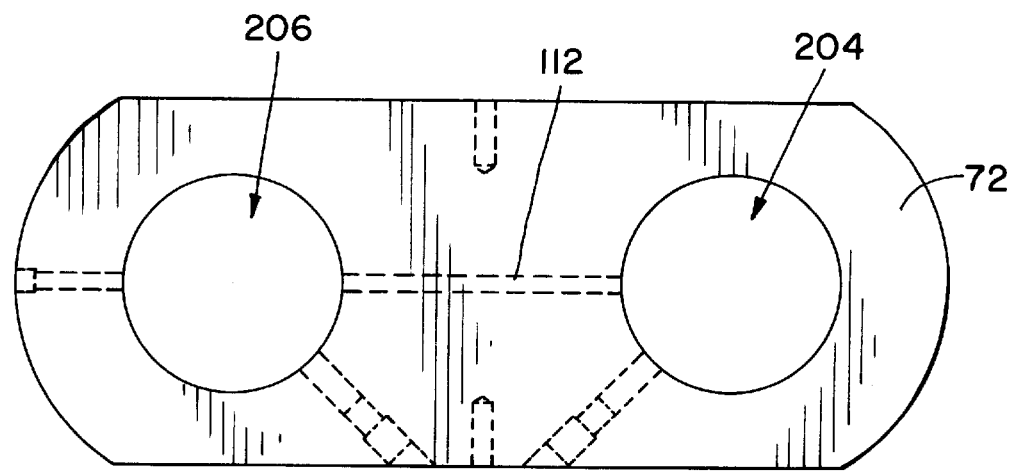
FIG. 13A is an upper section view of the linking member of FIG. 11A.
Figure 13B:
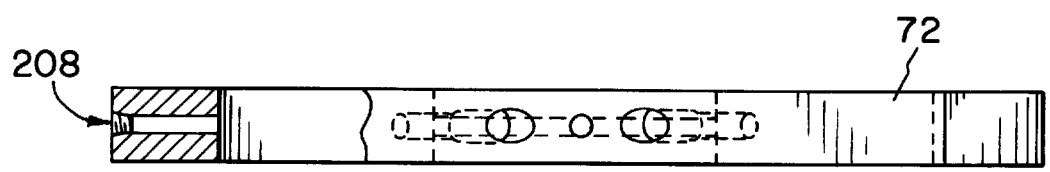
FIG. 13B is a multiple lateral view of the linking member of FIG. 13A taken along line A—A thereof for depicting the linking member in both a cross-sectional and exterior view.

Referring now to FIGS. 11–13, there is shown in FIG. 11A an upper schematic view of linking member 72 as assembled with connection pins 74 and 76. As shown in the cross-sectional view of FIG. 11B taken along line A—A of FIG. 11A, representative hydrostatic bearing pad 100 of connection pin 76 includes a fluid pathway arrangement 110 comprising a fluid channel 194 connected to pad 100 and a connecting fluid channel 196 that is configured for fluid communication with fluid pathway 112 formed in linking member 72 and arranged for fluid communication with connection pin 74. Each of the connection pins 74 and 76 is adapted for non-rotation using respective dowel pins 198 and 200. FIG. 12A shows a side view of connection pin 76 further illustrating hydrostatic bearing pad 100 and its connected arrangement of fluid channels 194 and 196, while FIG. 12B is an axial end view thereof. FIG. 12C is a cross-sectional view of hydrostatic bearing pad 100 taken along line A—A, in which is shown a recess area 202 formed in connection pin 76 that defines pad 100. FIG. 13A shows linking member 72 to illustrate its bore areas 204 and 206 defined therein for respectively receiving connection pins 74 and 76. FIG. 13B is a cross-sectional view of linking member 72 taken along line A—A of FIG. 13A to illustrate the insertion points for dowels 198, 200 and oil plug 208.

The hydrostatic pads are arranged to provide an opposing force against the loads being applied to the connection 68 pin. In some instances, the applied loads are directed inward, that is, the applied load is in a direction trying to push pins 68 and 70 toward each other creating a compressive load on link member 66. To resist this load, the hydrostatic pads 86, 88 and 90, 92 are placed facing away from each other to resist this inwardly applied load. In other cases, the applied loads are directed outward, that is, the applied load is in a direction trying to pull pins 74 and 76 away from each other creating a tensile load on link member 72. To resist this load, the hydrostatic pads 94, 96 and 98 100 are placed facing each other to resist this outwardly applied load.

It should be appreciated that the illustrated arrangement of fluid pathways and channels enabling pressurized fluid to reach the hydrostatic bearing pads is shown and described herein for illustrative purposes only and should not be construed in limitation of the present invention, since other such arrangements may be alternatively provided to establish fluid communication with the hydrostatic bearing pads. Additionally, the specific placement, orientation, number, and structural implementation of the hydrostatic bearing pads described herein are for illustrative purposes only, as the bearing support system of the present invention may be developed with other alternative arrangements of hydrostatic bearing pads tailored, for example, to the desired load-carrying capability. Furthermore, although the bearing support system is shown as implementable in connection with wrist pins associated with the illustrated coupling assembly 50, the present invention is equally applicable to journal members and other connection joints located at other press machine sites, such as the crankshaft journal bearings and the wrist pin connection between the crankshaft connecting arm assembly and the piston assembly.

What has been shown and described herein is a bearing support system that provides a combined hydrostatic and hydrodynamic lubrication capability at press machine sites such as wrist pins and other such journal bearings where hydrodynamic activity is typically not a dominant effect or where the "lift-off" effects from hydrodynamic activity needs to be reduced, modified, or eliminated. For example, the hydrostatic bearing pads of the bearing support system are preferably formed in rotational journal bearings and/or oscillation bearings characterized by relatively little rotation, oscillation, and/or slow rotational speeds. The hydrostatic bearing pads enable a sufficient oil film to be developed between bearing surfaces even while in a static condition. The hydrostatic bearing support, in particular, provides the connecting joint with continuous pressurized fluid, enabling a load-carrying pressurized film to exist that remains sustainable throughout all of the press conditions, most notably during static periods. In conventional systems, wrist pin joints and other such journal members are typically arranged, if at all, for only a hydrodynamic effect that requires a suitable amount of relative rotation between the components. In the absence of sufficient relative rotation, the hydrodynamic activity that does appear typically provides inadequate bearing support. Conventional press machines are therefore vulnerable to failure at these types of rotational and oscillating bearings having little or no relative rotation.

In accordance with another advantageous feature of the present invention, the hydrostatic bearing pads ensure that the bearing surfaces are separated by a film of oil before rotation of the bearing occurs, guaranteeing that the bearing will not experience "lift-off" after the press starts running. Since the lift-off occurs when oil is supplied and not after rotation begins, the end-of-stroke position for the press ram is not affected. Accordingly, the ram tooling can be set without the need to account for the change in position caused by bearing surface lift-off, thus reducing the risk of damaged tooling and/or poor quality manufactured parts.

While this invention has been described as having a preferred design, the present invention can be further modified within the spirit and scope of this disclosure. This application is therefore intended to cover any variations, uses, or adaptations of the invention using its general principles.

Further, this application is intended to cover such departures from the present disclosure as come within known or customary practice in the art to which this invention pertains and which fall within the limits of the appended claims.

What is claimed is:

1. A press, comprising:
    a frame structure with a crown and a bed;
    a slide associated with the frame structure for reciprocating movement in opposed relation to said bed;
    a drive means associated with said frame structure for reciprocating said slide;
    a balance means associated with said frame structure for balancing said slide;
    a coupling means for coupling said balance means to said drive means, said coupling means comprising:
        a rocker assembly, said rocker assembly including a plurality of pivot pins,
        a first link assembly for coupling said drive means to said rocker assembly, said first link assembly including a first plurality of connection pins, and
        a second link assembly for coupling said balance means to said rocker assembly, said second link assembly including a second plurality of connection pins;
    a plurality of hydrostatic bearing pads each integrally associated with a respective pin from among said first plurality of connection pins, said second plurality of connection pins, and said plurality of pivot pins and each arranged to facingly oppose the bearing surface of an associated bushing disposed about said respective pin; and
    means for providing each one of said plurality of hydrostatic bearing pads with pressurized fluid at least sufficient to create a hydrostatic bearing between the pin associated therewith and its respective bushing.

2. The press as recited in claim 1, wherein the pressurized fluid provided by said pressurized fluid providing means is sufficient further to create a hydrodynamic bearing between the respective pin and its associated bushing.

3. The press as recited in claim 1, wherein:
    said rocker assembly further comprising:
        a plurality of rocker arms each pivotingly mounted to a respective one of said plurality of pivot pins;
    said first link assembly further comprising:
        a plurality of linking members each associated with a respective one of said plurality of rocker arms and further associated with a respective pair of connection pins from among said first plurality of connection pins, wherein one of said connection pin pair provides a connection between said respective linking member at one end thereof and said associated rocker arm and the other of said connection pin pair provides a connection between said respective linking member at another end thereof and said piston assembly; and
    said second link assembly further comprising:
        a plurality of linking members each associated with a respective one of said plurality of rocker arms and further associated with a respective pair of connection pins from among said second plurality of connection pins, wherein one of said connection pin pair provides a connection between said respective linking member at one end thereof and said associated rocker arm and the other of said connection pin pair provides a connection between said respective linking member at another end thereof and said balance means.

4. The press as recited in claim 3, wherein, for each cooperative arrangement including a rocker arm, a linking member associated therewith from said first link assembly, and a linking member associated therewith from said second link assembly, said pressurized fluid providing means further comprises:

a rocker arm fluid means formed in said rocker arm and arranged to provide fluid communication between the associated pivot pin and each one of the connection pins associated therewith from said first plurality of connection pins and said second plurality of connection pins;

a first fluid means formed in the linking member of said first link assembly and arranged to provide fluid communication between the pair of pins associated therewith from said first plurality of connection pins;

a second fluid means formed in the linking member of said second link assembly and arranged to provide fluid communication between the pair of pins associated therewith from said second plurality of connection pins; and in respect of each hydrostatic bearing pad associated with said cooperative arrangement, means formed in the respective pin associated with said hydrostatic bearing pad and arranged to provide fluid communication between said hydrostatic bearing pad and the ones of said rocker arm fluid means, said first fluid means, and said second fluid means associated therewith.

5. The press as recited in claim 4, wherein said pressurized fluid providing means further comprises:

a pump arranged in fluid communication with at least one of said rocker arm fluid means, said first fluid means, and said second fluid means to supply pressurized fluid thereto.

6. The press as recited in claim 5, wherein said pump is arranged in fluid communication with a fluid port formed in a stationary member of said press, said fluid port forming part of a fluid passageway defined in said stationary member and arranged for fluid communication with at least one of said rocker arm fluid means, said first fluid means, and said second fluid means.

7. The press as recited in claim 1, wherein said drive means further comprises:

a crankshaft rotatably disposed within said crown; and
means, including a connecting arm assembly coupled to said crankshaft and connectedly arranged with said piston assembly, for transmitting the rotary motion of said crankshaft to said piston assembly as a reciprocating linear motion.

8. The press as recited in claim 7, further comprises:

a plurality of wrist pins arranged to couple said connecting arm assembly to said piston assembly;
a plurality of hydrostatic bearing pads each integrally associated with a respective one of said plurality of wrist pins and arranged to facingly oppose the bearing surface of an associated bushing disposed about said respective wrist pin; and
means for providing each one of said plurality of hydrostatic bearing pads associated with said wrist pins with pressurized fluid at least sufficient to create a hydrostatic bearing between the wrist pin associated therewith and its respective bushing.

9. The press as recited in claim 8, wherein the pressurized fluid provided by said pressurized fluid providing means associated with the plurality of hydrostatic bearing pads associated with said wrist pins is sufficient further to create a hydrodynamic bearing between the respective wrist pin and its associated bushing.

10. A press, comprising:

a frame structure with a crown and a bed;
a slide associated with said frame structure for reciprocating movement in opposed relation to said bed;
a drive means associated with said frame structure for reciprocating said slide, said drive means including a piston assembly coupled to said slide;
a weight assembly;
a coupling means, including at least one connection assembly, for coupling said weight assembly to said piston assembly in a manner defining a balancing relationship between said weight assembly and said slide, each one of said at least one connection assembly comprising:

a rocker arm pivotingly mounted to an associated pivot pin, said pivot pin including a hydrostatic bearing formation arranged to facingly oppose the bearing surface of an associated bushing disposed about said pivot pin, a first linking member connected at one end thereof to said rocker arm using a respective one of an associated connection pin pair and connected at another end thereof to said piston assembly using a respective another of the associated connection pin pair, each one of said connection pin pair associated therewith including a respective hydrostatic bearing formation arranged to facingly oppose the bearing surface of an associated bushing disposed about said connection pin, and a second linking member connected at one end thereof to said rocker arm using a respective one of an associated connection pin pair and connected at another end thereof to said weight assembly using a respective another of the associated connection pin pair, each one of said connection pin pair associated therewith including a respective hydrostatic bearing formation arranged to facingly oppose the bearing surface of an associated bushing disposed about said connection pin; and means for providing each one of said hydrostatic bearing formations associated with the at least one connection assembly of said coupling means with pressurized fluid at least sufficient to create a hydrostatic bearing between the pin associated therewith and its respective bushing.

11. The press as recited in claim 10, wherein the pressurized fluid provided by said pressurized fluid providing means is sufficient further to create a hydrodynamic bearing between the respective pin and its associated bushing.

12. The press as recited in claim 10, wherein each one of said hydrostatic bearing formations associated with the at least one connection assembly of said coupling means further comprises:

at least one hydrostatic bearing pad.

13. The press as recited in claim 10, wherein each one of said at least one connection assembly of said coupling means further comprises:

a rocker arm fluid means formed in said rocker arm and arranged to provide fluid communication between the pivot pin associated therewith and each one of the connection pins associated therewith;

a first fluid means formed in said first linking member and arranged to provide fluid communication between the pair of connection pins associated therewith;

a second fluid means formed in said second linking member and arranged to provide fluid communication between the pair of connection pins associated therewith; and in respect of each hydrostatic bearing formation associated with the one of said at least one connection assembly, means formed in the respective pin associated with said hydrostatic bearing formation and arranged to provide fluid communication between said hydrostatic bearing formation and the ones of said rocker arm fluid means, said first fluid means, and said second fluid means associated therewith.

14. The press as recited in claim 13, wherein said pressurized fluid providing means further comprises:

a pump arranged in fluid communication with at least one of said rocker arm fluid means, said first fluid means, and said second fluid means to supply pressurized fluid thereto.

15. The press as recited in claim 14, wherein said pump is arranged in fluid communication with a fluid port formed in a stationary member of said press, said fluid port forming part of a fluid passageway defined in said stationary member and arranged for fluid communication with at least one of said rocker arm fluid means, said first fluid means, and said second fluid means.

16. The press as recited in claim 13, wherein each one of said rocker arm fluid means, said first fluid means, and said second fluid means further comprises:

at least one fluid passageway.

17. A bearing system for use in a press machine, said press machine including a slide; a drive means including a piston assembly for operatively reciprocating the slide; a weight assembly; a rocker assembly including a plurality of pivot pins; a first link assembly for coupling said piston assembly to said rocker assembly using a first plurality of connection pins; and a second link assembly for coupling said weight assembly to said rocker assembly using a second plurality of connection pins, said bearing system comprising:

a plurality of hydrostatic bearing formations each integrally associated with a respective one of said plurality of pivot pins and each arranged to facingly oppose the bearing surface of an associated bushing disposed about said respective pivot pin;

a plurality of hydrostatic bearing formations each integrally associated with a respective one of said first plurality of connection pins and each arranged to facingly oppose the bearing surface of an associated bushing disposed about said respective connection pin;

a plurality of hydrostatic bearing formations each integrally associated with a respective one of said second plurality of connection pins and each arranged to facingly oppose the bearing surface of an associated bushing disposed about said respective connection pin; and means for providing each one of said hydrostatic bearing formations with pressurized fluid at least sufficient to create a hydrostatic bearing between the pin associated therewith and its respective bushing.

18. The bearing system as recited in claim 17, wherein the pressurized fluid provided by said pressurized fluid providing means is sufficient further to create a hydrodynamic bearing between the respective pin and its associated bushing.

19. The bearing system as recited in claim 17, wherein each one of said hydrostatic bearing formations further comprises:

at least one hydrostatic bearing pad.

20. The bearing system as recited in claim 17, wherein:

said rocker assembly further comprising:
    a plurality of rocker arms each pivotingly mounted to a respective one of said plurality of pivot pins;

said first link assembly further comprising:
    a plurality of linking members each associated with a respective one of said plurality of rocker arms and further associated with a respective pair of connection pins from among said first plurality of connection pins, wherein one of said connection pin pair provides a connection between said respective linking member at one end thereof and said associated rocker arm and the other of said connection pin pair provides a connection between said respective linking member at another end thereof and said piston assembly; and said second link assembly further comprising:
    a plurality of linking members each associated with a respective one of said plurality of rocker arms and further associated with a respective pair of connection pins from among said second plurality of connection pins, wherein one of said connection pin pair provides a connection between said respective linking member at one end thereof and said associated rocker arm and the other of said connection pin pair provides a connection between said respective linking member at another end thereof and said weight assembly.

21. The bearing system as recited in claim 20, wherein, for each cooperative arrangement including a rocker arm, a linking member associated therewith from said first link assembly, and a linking member associated therewith from said second link assembly, said pressurized fluid providing means further comprises:

a rocker arm fluid means formed in said rocker arm and arranged to provide fluid communication between the associated pivot pin and each one of the connection pins associated therewith from said first plurality of connection pins and said second plurality of connection pins;

a first fluid means formed in the linking member of said first link assembly and arranged to provide fluid communication between the pair of pins associated therewith from said first plurality of connection pins;

a second fluid means formed in the linking member of said second link assembly and arranged to provide fluid communication between the pair of pins associated therewith from said second plurality of connection pins; and in respect of each hydrostatic bearing formation associated with said cooperative arrangement, means formed in the respective pin associated with said hydrostatic bearing formation and arranged to provide fluid communication between said hydrostatic bearing formation and the ones of said rocker arm fluid means, said first fluid means, and said second fluid means associated therewith.

22. The bearing system as recited in claim 21, wherein said pressurized fluid providing means further comprises:

a pump arranged in fluid communication with at least one of said rocker arm fluid means, said first fluid means, and said second fluid means to supply pressurized fluid thereto.

23. The bearing system as recited in claim 22, wherein said pump is arranged in fluid communication with a fluid port formed in a stationary member of said press, said fluid port forming part of a fluid passageway defined in said stationary member and arranged for fluid communication with at least one of said rocker arm fluid means, said first fluid means, and said second fluid means.

24. The bearing system as recited in claim 21, wherein each one of said rocker arm fluid means, said first fluid means, and said second fluid means further comprises:
at least one fluid passageway.

25. A bearing system for use in a press machine, said press machine including a slide; a drive means including a piston assembly for operatively reciprocating the slide; a weight assembly; and at least one connection assembly for coupling said weight assembly to said piston assembly, each one of said at least one connection assembly comprising a rocker arm pivotingly mounted to an associated pivot pin, a first linking member connected at respective ends thereof to said rocker arm and said piston assembly using a pair of connection pins associated therewith, and a second linking member connected at respective ends thereof to said rocker arm and said weight assembly using a pair of connection pins associated therewith, said bearing system comprising:
a plurality of hydrostatic bearing formations each integrally associated with a respective pivot pin of an associated rocker arm of a corresponding one of said at least one connection assembly and arranged to facingly oppose the bearing surface of an associated bushing disposed about said respective pivot pin;
a plurality of hydrostatic bearing formations each integrally associated With a respective one of the pair of connection pins of an associated first linking member of a corresponding one of said at least one connection assembly and arranged to facingly oppose the bearing surface of an associated bushing disposed about said respective connection pin;
a plurality of hydrostatic bearing formations each integrally associated with a respective one of the pair of connection pins of an associated second linking member of a corresponding one of said at least one connection assembly and arranged to facingly oppose the bearing surface of an associated bushing disposed about said respective connection pin; and
means for providing each one of said hydrostatic bearing formations with pressurized fluid at least sufficient to create a hydrostatic bearing between the pin associated therewith and its respective bushing.

26. The bearing system as recited in claim 25, wherein the pressurized fluid provided by said pressurized fluid providing means is sufficient further to create a hydrodynamic bearing between the respective pin and its associated bushing.

27. The bearing system as recited in claim 25, wherein each one of said hydrostatic bearing formations associated with said at least one connection assembly further comprises:
at least one hydrostatic bearing pad.

28. The bearing system as recited in claim 25, wherein each one of said at least one connection assembly further comprises:
a rocker arm fluid means formed in said rocker arm and arranged to provide fluid communication between the pivot pin associated therewith and each one of the connection pins associated therewith;
a first fluid means formed in said first linking member and arranged to provide fluid communication between the pair of connection pins associated therewith;
a second fluid means formed in said second linking member and arranged to provide fluid communication between the pair of connection pins associated therewith; and
in respect of each hydrostatic bearing formation associated with the one of said at least one connection assembly, means formed in the respective pin associated with said hydrostatic bearing formation and arranged to provide fluid communication between said hydrostatic bearing formation and the ones of said rocker arm fluid means, said first fluid means, and said second fluid means associated therewith.

29. The bearing system as recited in claim 28, wherein said pressurized fluid providing means further comprises:
a pump arranged in fluid communication with at least one of said rocker arm fluid means, said first fluid means, and said second fluid means to supply pressurized fluid thereto.

30. The bearing system as recited in claim 29, wherein said pump is arranged in fluid communication with a fluid port formed in a stationary member of said press, said fluid port forming part of a fluid passageway defined in said stationary member and arranged for fluid communication with at least one of said rocker arm fluid means, said first fluid means, and said second fluid means.

31. The bearing system as recited in claim 28, wherein each one of said rocker arm fluid means, said first fluid means, and said second fluid means further comprises:
at least one fluid passageway.

32. A press, comprising:
a frame structure with a crown and a bed;
a slide associated with the frame structure for reciprocating movement in opposed relation to said bed;
a drive means associated with said frame structure for reciprocating said slide, said drive means including a piston assembly coupled to said slide;
a balance means associated with said frame structure for balancing said slide;
a coupling means for coupling said balance means to said piston assembly, said coupling means comprising:
a rocker assembly, said rocker assembly including a plurality of pivot journal members;
a first link assembly for coupling said piston assembly to said rocker assembly using a first plurality of connection journal members; and
a second link assembly for coupling said balance means to said rocker assembly using a second plurality of connection journal members;
a plurality of hydrostatic bearing formations each integrally associated with a respective journal member from among said first plurality of connection journal members, said second plurality of connection journal members, and said plurality of pivot journal members and each arranged to facingly oppose the bearing surface of an associated bushing disposed about said respective journal member; and
means for providing each one of said plurality of hydrostatic bearing formations with pressurized fluid at least sufficient to create a hydrostatic bearing between the journal member associated therewith and its respective bushing.

33. The press as recited in claim 32, wherein the pressurized fluid provided by said pressurized fluid providing means is sufficient further to create a hydrodynamic bearing between the respective journal member and its associated bushing.

34. The press as recited in claim 32, wherein each one of said hydrostatic bearing formations further comprises:

at least one hydrostatic bearing pad.

35. The press as recited in claim 32, wherein:

said plurality of pivot journal members are arranged as integral parts of a respective common shaft;

said first plurality of connection journal members are arranged as integral parts of a respective common shaft; and said second plurality of connection journal members are arranged as integral parts of a respective common shaft.

36. A bearing system for use in a press machine, said press machine including a slide; a drive means including a piston assembly for operatively reciprocating the slide; a weight assembly; a rocker assembly including a plurality of pivot journal members; a first link assembly for coupling said piston assembly to said rocker assembly using a first plurality of connection journal members; and a second link assembly for coupling said weight assembly to said rocker assembly using a second plurality of connection journal members, said bearing system comprising:

a plurality of hydrostatic bearing formations each integrally associated with a respective one of said plurality of pivot journal members and each arranged to facingly oppose the bearing surface of an associated bushing disposed about said respective pivot journal member;

a plurality of hydrostatic bearing formations each integrally associated with a respective one of said first plurality of connection journal members and each arranged to facingly oppose the bearing surface of an associated bushing disposed about said respective connection journal member;

a plurality of hydrostatic bearing formations each integrally associated with a respective one of said second plurality of connection journal members and each arranged to facingly oppose the bearing surface of an associated bushing disposed about said respective connection journal member; and means for providing each one of said hydrostatic bearing formations with pressurized fluid at least sufficient to create a hydrostatic bearing between the journal member associated therewith and its respective bushing.

37. The bearing system as recited in claim 36, wherein the pressurized fluid provided by said pressurized fluid providing means is sufficient further to create a hydrodynamic bearing between the respective journal member and its associated bushing.

38. The bearing system as recited in claim 37, further comprising:

a crankshaft, and said journal member comprises a crankshaft journal bearing;

said hydrostatic bearing providing one of reduced and elimination of crankshaft journal bearing "lift-off" between said crankshaft and said hydrodynamic bearing during press starts.

39. The bearing system as recited in claim 36, wherein each one of said hydrostatic bearing formations further comprises:

at least one hydrostatic bearing pad.

40. The bearing system as recited in claim 36, wherein:

said plurality of pivot journal members are arranged as integral parts of a respective common shaft;

said first plurality of connection journal members are arranged as integral parts of a respective common shaft; and said second plurality of connection journal members are arranged as integral parts of a respective common shaft.

\* \* \* \* \*